US008094178B2

(12) United States Patent
Yamashita

(10) Patent No.: US 8,094,178 B2
(45) Date of Patent: Jan. 10, 2012

(54) METHOD AND APPARATUS FOR FORMING IMAGE

(75) Inventor: Hidetoshi Yamashita, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 869 days.

(21) Appl. No.: 12/125,447

(22) Filed: May 22, 2008

(65) Prior Publication Data
US 2008/0292342 A1 Nov. 27, 2008

(30) Foreign Application Priority Data

May 24, 2007 (JP) ................................. 2007-137399
May 9, 2008 (JP) ................................. 2008-123327

(51) Int. Cl.
B41J 2/435 (2006.01)
B41J 2/385 (2006.01)
G03G 13/04 (2006.01)

(52) U.S. Cl. .................... 347/246; 347/133; 347/236
(58) Field of Classification Search .............. 347/132, 347/133, 162, 168, 236, 237, 246, 247
See application file for complete search history.

(56) References Cited

U.S. PATENT DOCUMENTS

| 4,443,695 | A | * | 4/1984 | Kitamura | 250/205 |
| 4,897,672 | A | * | 1/1990 | Horiuchi et al. | 347/236 |
| 5,043,745 | A | * | 8/1991 | Inoue et al. | 347/246 |
| 5,721,579 | A | * | 2/1998 | Ogasawara et al. | 347/246 |
| 6,081,289 | A | * | 6/2000 | Ogasawara et al. | 347/246 |
| 6,989,849 | B2 | * | 1/2006 | Nomura et al. | 347/133 |
| 7,139,012 | B2 | * | 11/2006 | Inukai | 347/236 |
| 7,294,824 | B2 | * | 11/2007 | Maeda | 250/234 |
| 7,626,605 | B2 | * | 12/2009 | Nomura et al. | 347/236 |
| 2003/0112420 | A1 | | 6/2003 | Suda | |
| 2005/0036026 | A1 | | 2/2005 | Inukai | |
| 2005/0157155 | A1 | | 7/2005 | Vazan | |
| 2007/0229647 | A1 | * | 10/2007 | Kawano et al. | 347/224 |
| 2009/0190943 | A1 | * | 7/2009 | Yamashita | 399/51 |
| 2010/0066799 | A1 | * | 3/2010 | Yamashita | 347/225 |
| 2010/0150591 | A1 | * | 6/2010 | Yamashita | 399/51 |
| 2011/0043594 | A1 | * | 2/2011 | Yamashita | 347/246 |

FOREIGN PATENT DOCUMENTS

| JP | 2003-72139 | 3/2003 |
| JP | 2005-161790 | 6/2005 |
| JP | 2007-21826 | 2/2007 |

OTHER PUBLICATIONS

Extended Search Report issued Jun. 1, 2011 in Europe Application No. 08251777.2.

* cited by examiner

Primary Examiner — Uyen Chau N Le
Assistant Examiner — John M Bedtelyon
(74) Attorney, Agent, or Firm — Oblon, Spivak, McClelland, Maier & Neustadt, L.L.P.

(57) ABSTRACT

In an image forming apparatus, a separating unit separates each laser beam into a first laser beam used for measuring light intensity and a second laser beam used for scanning a photosensitive element, a photoelectric converting unit measures a light intensity of each of the first laser beams and outputs a voltage indicative of the light intensity. A control unit controls a light intensity of each of the laser beams based on a common drive current and a corresponding one of a current correction value, which is set by each of the laser beams to correct a light intensity of a corresponding one of the laser beams based on a corresponding one of the voltages output by the photoelectric converting unit.

7 Claims, 16 Drawing Sheets

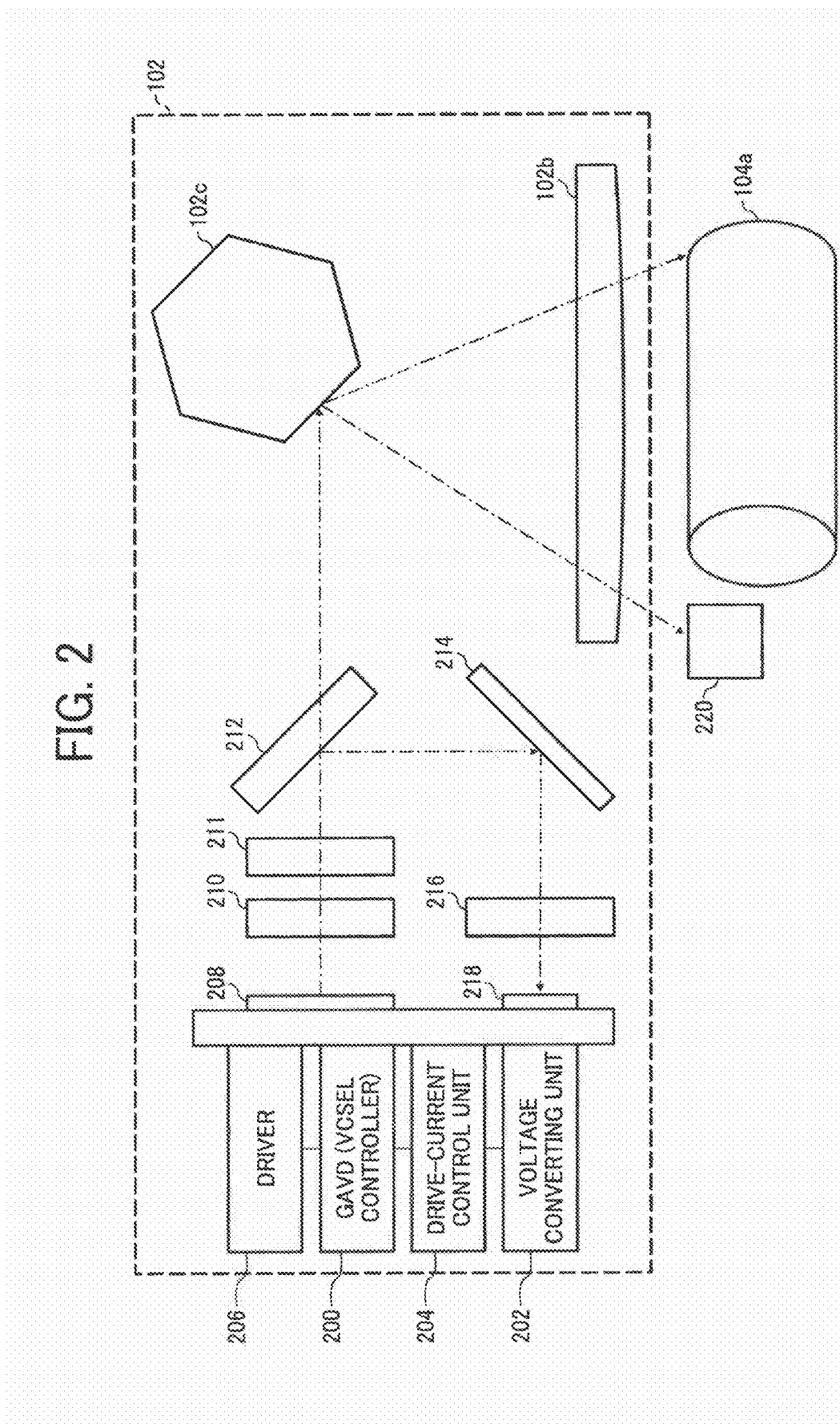

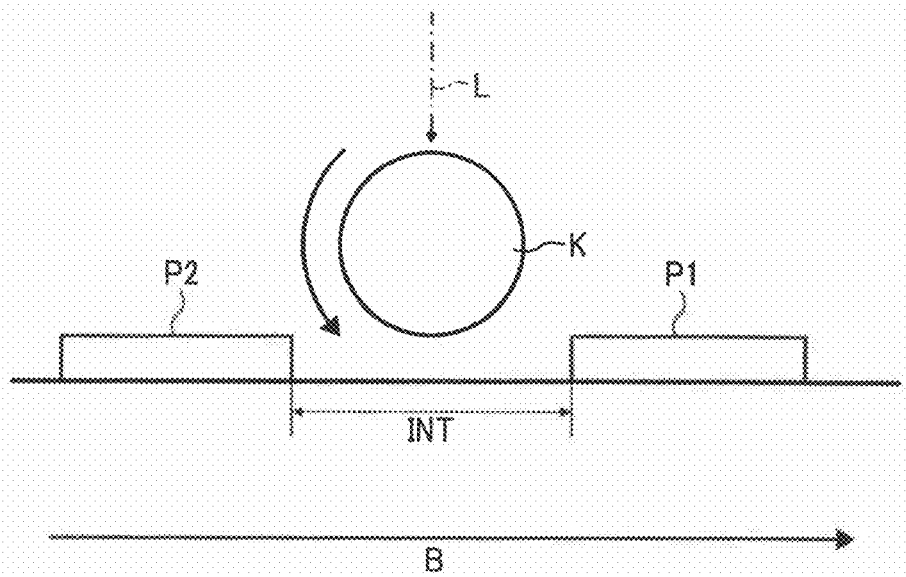
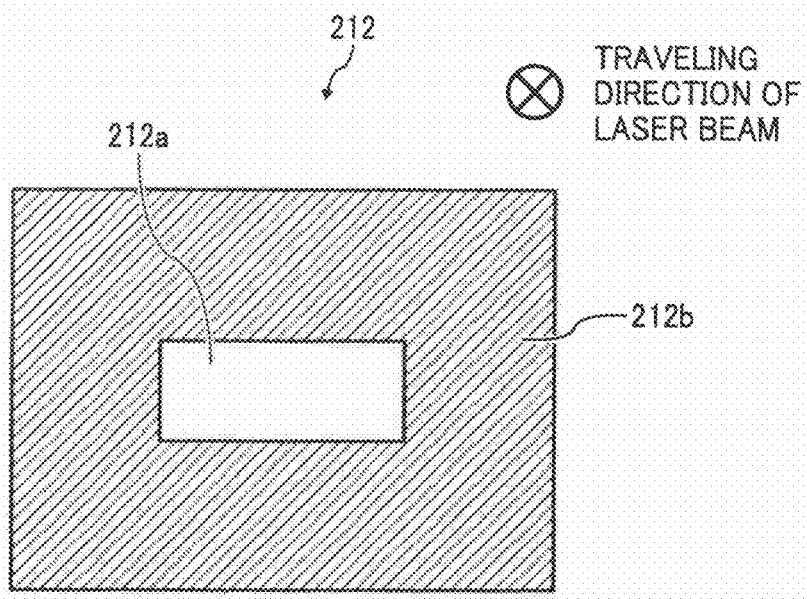

TRAVELING
DIRECTION OF
LASER BEAM
⊗

TRAVELING
DIRECTION OF
LASER BEAM
⊗

TRAVELING
DIRECTION OF
LASER BEAM
⊗

TRAVELING
DIRECTION OF
LASER BEAM

TRAVELING
DIRECTION OF
LASER BEAM

FIG. 10

| CHANNEL NUMBER | ROM AREA | | RAM AREA | |
|---|---|---|---|---|
| | MONITOR VOLTAGE Vpd WHEN LASER BEAM HAVING PREDETERMINED LIGHT INTENSITY IS OUTPUT | INITIALIZATION CURRENT Isw(0) | COMMON CURRENT Isw | CURRENT CORRECTION VALUE DEV |
| CHANNEL 1 | Vpd1(0) | =(Iswi_max+Iswi_min)/2 | Isw(1) | DEV1(0) |
| CHANNEL 2 | Vpd2(0) | | | DEV2(0) |
| CHANNEL 3 | Vpd3(0) | | | DEV3(0) |
| CHANNEL 4 | Vpd4(0) | | | DEV4(0) |
| CHANNEL 5 | Vpd5(0) | | | DEV5(0) |
| ⋮ | ⋮ | | | ⋮ |
| CHANNEL 39 | Vpd39(0) | | | DEV39(0) |
| CHANNEL 40 | Vpd40(0) | | | DEV40(0) |

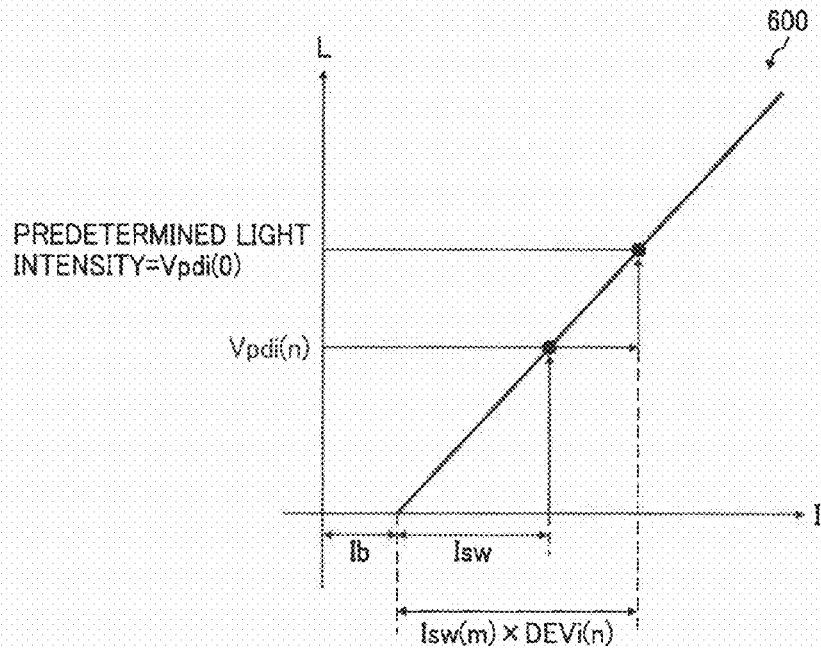
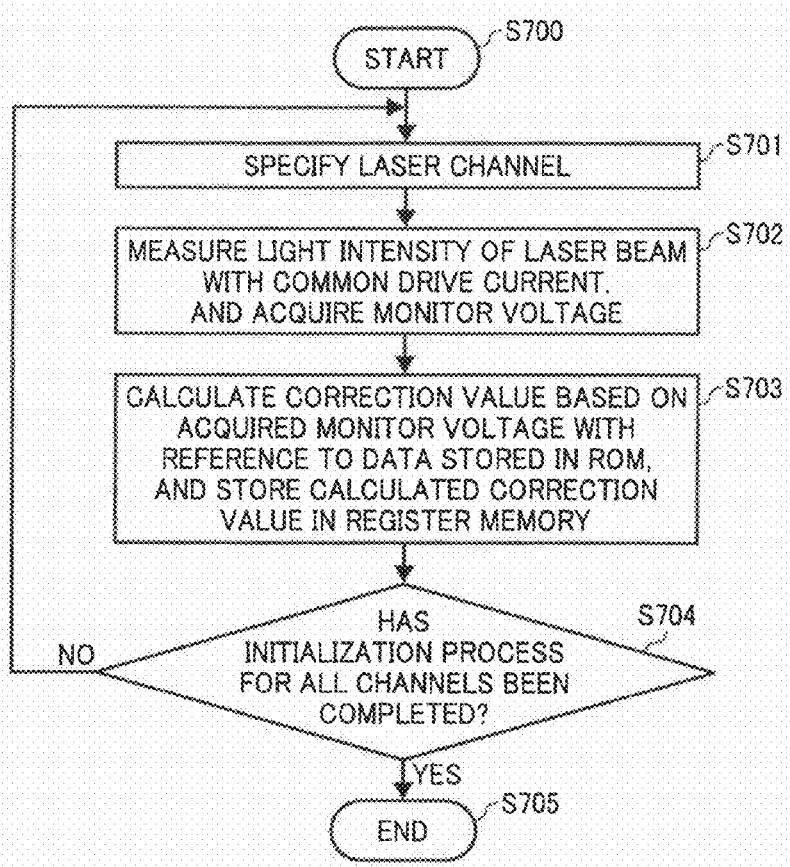

METHOD AND APPARATUS FOR FORMING IMAGE

CROSS-REFERENCE TO RELATED APPLICATIONS

The present application claims priority to and incorporates by reference the entire contents of Japanese priority documents 2007-137399 filed in Japan on May 24, 2007 and 2008-123327 filed in Japan on May 9, 2008.

BACKGROUND OF THE INVENTION

1. Field of the Invention

The present invention relates to a method and an apparatus for forming an image with multiple beams.

2. Description of the Related Art

In a typical electrophotographic image forming apparatus, a laser diode exposes a static electric charge formed on a photosensitive drum to a laser light, and thereby forming an electrostatic latent image. Then, a visible image is formed by developing the electrostatic latent image with a developer. A conventional laser diode generally emits one to four laser beams or at most eight laser beams per laser diode element. Recently, a surface emitting laser referred to as a vertical-cavity surface-emitting laser (VCSEL) has been commercially available, and put to practical use. Image forming apparatuses that include the VCSEL can form images at high resolution and high speed.

Japanese Patent Application Laid-open No. 2007-021826 discloses an image forming apparatus (an optical writing device) that employs a VCSEL. In this image forming apparatus, as shown in FIG. 22, a light source unit 1001 is composed of a laser diode array in which a plurality of light sources (a plurality of laser diodes) are arrayed in a lattice-like pattern or a surface emitting laser in which a plurality of light sources (a plurality of VCSELs or a plurality of surface-emitting laser diodes) are arrayed on the same chip in a lattice-like pattern. The layout and the orientation of the light source unit 1001 is adjusted in such a manner that an array direction of the light sources makes an angle θ with respect to a rotating shaft of a deflector such as a polygon mirror.

In the light source unit 1001 shown in FIG. 22, each of the light sources is denoted by a combination of a vertical array direction and a lateral array direction. The vertical array direction is separated into "a", "b", and "c" from the top in a vertical direction. The lateral array direction is separated into "1", "2", "3", and "4" from the left in a lateral direction. For example, the top-left light source is denoted by "a1". The light source unit 1001 is tilted at the angle θ, so that each of the light sources exposes a different scan field. It is assumed that two of the light sources compose one pixel. For example, the light sources a1 and a2 compose one pixel, and the light sources a3 and a4 compose another one pixel. Such pixels, which are respectively composed by the two light sources, are illustrated on the extreme right in FIG. 22. Furthermore, it is assumed that the vertical direction in FIG. 22 corresponds to a sub-scanning direction, and a center-to-center distance between the pixels is equivalent to 600 dots per inch (dpi). In other words, a center-to-center distance between each two of the light sources composing one pixel is equivalent to 1200 dpi. Namely, the light-source density is twice as much as the pixel density. By changing a light intensity ratio of the light sources composing one pixel, a position of a gravity center of the pixel can be shifted in the sub-scanning direction. Consequently, it is possible to form an image at high resolution.

The VCSEL can emit about forty laser beams from one chip, so that it can be considered that an image forming apparatus can form an image at high resolution and high speed by the use of the VCSEL. However, even if a laser diode is simply replaced with the VCSEL, it is not enough to form a latent image at sufficiently high resolution. For example, the VCSEL generates multiple laser beams, as if a surface were formed by the laser beams, from a predetermined light-emitting region, so that a light intensity of each of the laser beams to be emitted needs to be controlled to a target light intensity. Furthermore, the VCSEL has higher degree of integration of the laser beams, so that to form a latent image at high resolution stably, it is necessary to control the light intensity of each of the laser beams.

As the number of laser beams increases, it obviously takes a longer time to control a light intensity of each of the laser beams. Therefore, an image forming apparatus that employs the VCSEL is slower as compared with that that employs a laser diode. If the light-intensity control process is skipped to increase the speed, the resolution decreases.

To solve the problems, various technologies have been developed. For example, in the image forming apparatus disclosed in Japanese Patent Application Laid-open No. 2007-021826, the optical writing device includes a plurality of light-emitting elements and a light-emitting light source unit having a light-intensity detecting element. The light-intensity detecting element detects an intensity of a light emitted from each of the light-emitting elements. To control a light intensity of each of optical beams, the optical writing device further includes volume resistances respectively for each of the optical beams and a sample-and-hold capacitor. With the conventional technology disclosed in Japanese Patent Application Laid-open No. 2007-021826, it is possible to control light intensities of multiple laser beams. However, the size of a control circuit of the VCSEL is disadvantageously large. In addition, each of the volume resistances needs to be reset to adjust the light intensities on the number of times corresponding to the number of the laser beams to be emitted, so that the work efficiency lowers, and the maintenance frequency is increased.

Furthermore, in a conventional technology disclosed in Japanese Patent Application Laid-open No. 2005-161790, the light intensity is controlled as follows. A first measuring unit separates each of optical beams output from a light source into a first optical beam and a second optical beam, and measures a light intensity of the first optical beam. A light-intensity control unit controls the light intensity of the first optical beam measured by the first measuring unit to a light intensity indicated in a light-intensity signal. A light intensity of the second optical beam is measured. A light-intensity correction value of each of the optical beams for controlling the light intensity of the second optical beam to be substantially equalized among a plurality of the optical beams is obtained based on the light intensity of the second optical beam. The obtained light-intensity correction value is stored in a storing unit.

With the conventional technology disclosed in Japanese Patent Application Laid-open No. 2005-161790, it is also possible to control a light intensity of each of laser beams emitted from a VCSEL. If the number of the laser beams is not many, it is possible to form an image with controlling a light intensity of each of the laser beams at a sufficiently-high feedback speed. However, the VCSEL emits multiple laser beams. Therefore, due to an environmental fluctuation of the VCSEL, it may fail of a feedback with respect to a control of a light-intensity of each of the laser beams within a scanning time of an image forming process with a sufficiently-high efficiency. Furthermore, when laser diode elements composing the VCSEL cannot provide a predetermined light intensity with a correction value in a default-setting correction range, it is not possible to complete the image forming process with preventing a currently-formed image from being critically affected. In addition, it is not possible to correct the light intensity efficiently.

As described above, when a light intensity of each of laser beams emitted from a VCSEL is to be controlled, as the number of the laser beams increases, the number of control processes also increases. Therefore, it is not possible to sufficiently take advantages of the VCSEL, such as high resolution and high speed. In addition, the production cost and the maintenance cost disadvantageously increase. Thus, there is room for improvement.

SUMMARY OF THE INVENTION

It is an object of the present invention to at least partially solve the problems in the conventional technology.

According to an aspect of the present invention, there is provided an image forming apparatus includes a plurality of light sources that respectively emit a laser beam, all the light sources being driven by a common drive current; a separating unit that separates each of the laser beams into a first laser beam used for measuring light intensity and a second laser beam used for scanning a photosensitive element; a photoelectric converting unit that measures a light intensity of each of the first laser beams and outputs a voltage indicative of the light intensity; and a control unit that controls a light intensity of each of the laser beams based on the common drive current and a corresponding one of a current correction value, which is set by each of the laser beams to correct a light intensity of a corresponding one of the laser beams based on a corresponding one of the voltages output by the photoelectric converting unit.

According to another aspect of the present invention, there is provided an image forming method implemented on an image forming apparatus including a plurality of light sources that respectively emit a laser beam, all the light sources being driven by a common drive current, the image forming method including separating with a separating unit each of the laser beams into a first laser beam used for measuring light intensity and a second laser beam used for scanning a photosensitive element; measuring with a photoelectric converting unit a light intensity of each of the first laser beams and outputting a voltage indicative of the light intensity; and controlling with a control unit a light intensity of each of the laser beams based on the common drive current and a corresponding one of a current correction value, which is set by each of the laser beams to correct a light intensity of a corresponding one of the laser beams based on a corresponding one of the voltages output at the measuring.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a plan view of an optical device shown in FIG. 1;
FIG. 3 is a schematic diagram for explaining a concrete example of a timing of a sheet-interval APC;
FIG. 4 is a schematic diagram of an optical separating unit including a light reflection member viewed from the side facing to a traveling direction of a laser beam;
FIG. 10 is a table of control data for the VCSEL;
FIG. 11 is a graph for explaining a calculation of a correction value;
FIG. 12 is a flowchart of an initialization process.

DETAILED DESCRIPTION OF THE PREFERRED EMBODIMENTS

Exemplary embodiments of the present invention are explained in detail below with reference to the accompanying drawings. However, the present invention is not limited to the embodiments.

Figure 1:
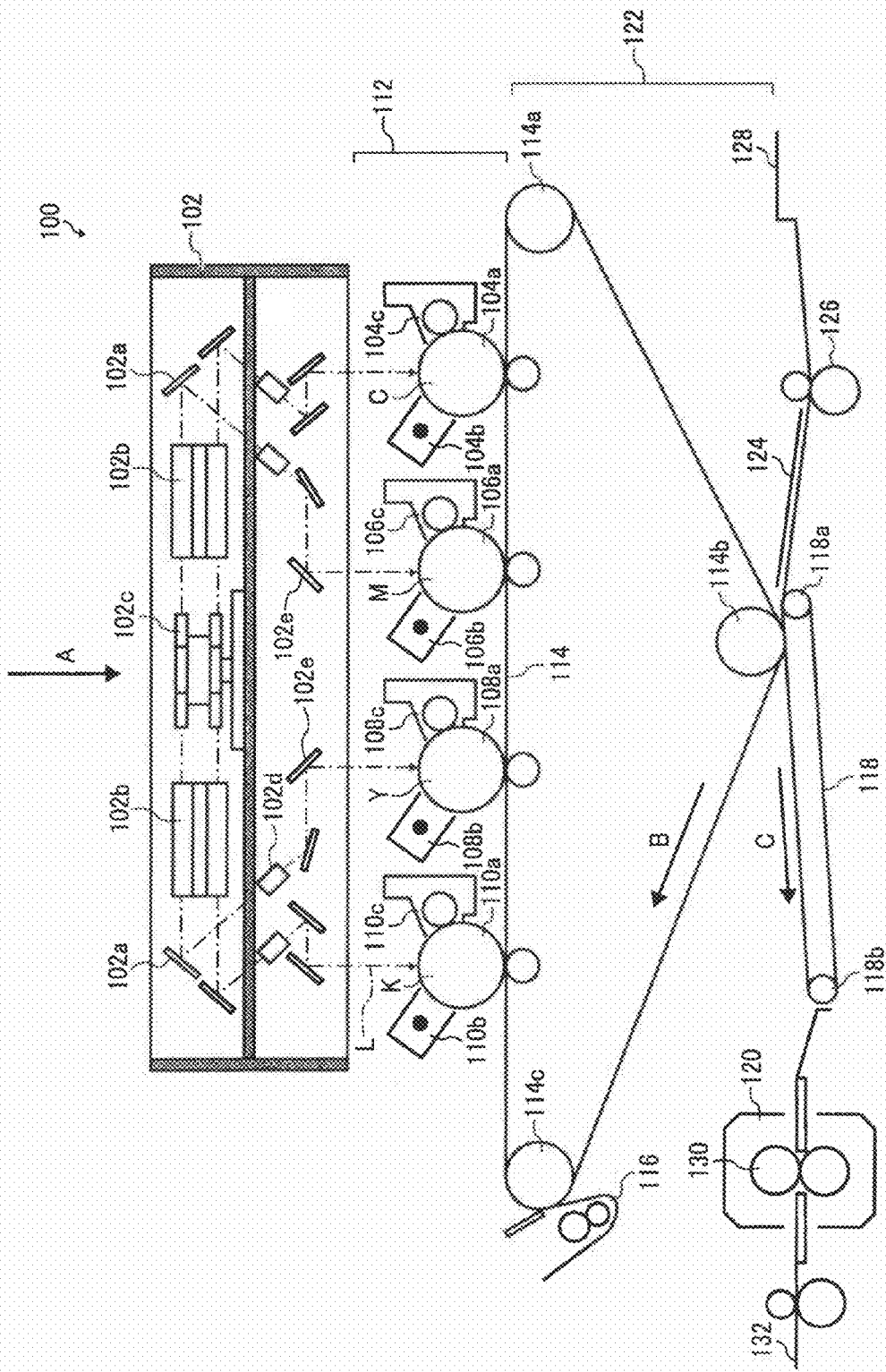
FIG. 1 is a schematic diagram of an image forming apparatus according to an embodiment of the present invention.

FIG. 1 is a schematic diagram of an image forming apparatus 100 according to an embodiment of the present invention. The image forming apparatus 100 includes an optical device 102, an image forming unit 112, and a transfer unit 122. The optical device 102 includes optical elements such as a polygon mirror 102c, f-theta lenses 102b, reflecting mirrors 102a, WTL lenses 102d, and reflecting mirrors 102e. The image forming unit 112 includes photosensitive drums 104a, 106a, 108a, and 110a, charger units 104b, 106b, 108b, and 110b, and developing units 104c, 106c, 108c, and 110c. The transfer unit 122 includes an intermediate transfer belt 114, conveying rollers 114*a*, 114*b*, and 114*c*, a cleaning unit 116, a secondary transfer unit, an image-receiving-medium containing unit 128, a conveying roller 126, and a fixing unit 120.

In the optical device 102, an optical beam emitted from a light source (not shown) such as a laser diode is deflected by the polygon mirror 102*c* so as to fall on the f-theta lens 102*b*. For example, optical beams respectively for cyan (C), magenta (M), yellow (Y), and black (K) color images corresponding to image data are emitted from the light source. After passing through the f-theta lens 102*b*, each of the optical beams is reflected by the corresponding reflecting mirror 102*a*.

After that, each of the optical beams is shaped, and deflected to the corresponding reflecting mirror 102*e* by the corresponding WTL lens 102*d*. Then, the optical beams for the C, M, Y, K color images are reflected by the corresponding reflecting mirror 102*e*, and emitted to the photosensitive drums 104*a*, 106*a*, 108*a*, and 110*a*, respectively, as an optical beam L used for exposure. In this manner, each of the photosensitive drums 104*a*, 106*a*, 108*a*, and 110*a* is exposed to the corresponding optical beam L via a plurality of the optical elements. Therefore, a timing synchronization of the emission of each of the optical beams L in a main scanning direction and a sub scanning direction is performed. The main scanning direction is a scanning direction of the optical beam L. The sub scanning direction is a direction perpendicular to the main scanning direction. In the image forming apparatus 100, the sub scanning direction is identical to a rotating direction of the photosensitive drums 104*a*, 106*a*, 108*a*, and 110*a*.

Each of the photosensitive drums 104*a*, 106*a*, 108*a*, includes a conductive drum made of aluminum or the like coated with a photoconductive layer. The photoconductive layer includes at least a charge generating layer and a charge transport layer. The charger units 104*b*, 106*b*, 108*b*, and 110*b* are respectively arranged to have contact with the photosensitive drums 104*a*, 106*a*, 108*a*, and 110*a* via the photoconductive layer. Each of the charger units 104*b*, 106*b*, 108*b*, and 110*b* includes a corotron, a scorotron, or a charging roller. The charger units 104*b*, 106*b*, 108*b*, and 110*b* respectively apply an electric charge to a surface, i.e., the photoconductive layer, of each of the photosensitive drums 104*a*, 106*a*, 108*a*, and 110*a*.

The static electric charge on the photosensitive drums 104*a*, 106*a*, 108*a*, and 110*a* is exposed to the corresponding optical beam L, whereby an electrostatic latent image is formed on each of the photosensitive drums 104*a*, 106*a*, 108*a*, and 110*a*. The electrostatic latent images formed on the photosensitive drums 104*a*, 106*a*, 108*a*, and 110*a* are developed into C, M, Y, K toner images by the developing units 104*c*, 106*c*, 108*c*, and 110*c*, respectively. Each of the developing units 104*c*, 106*c*, 108*c*, and 11*c* includes a developing sleeve, a developer supplying roller, and a control blade (all not shown).

The C, M, Y, K toner images on the photosensitive drums 104*a*, 106*a*, 108*a*, and 110*a* are sequentially transferred onto the intermediate transfer belt 114 in a superimposed manner thereby forming a full-color toner image. The intermediate transfer belt 114 moves in a direction of an arrow B by rotation of the conveying rollers 114*a*, 114*b*, and 114*c*. The intermediate transfer belt 114 with the full-color toner image on its surface moves toward the secondary transfer unit. The secondary transfer unit includes a secondary-transfer belt 118 and conveying rollers 118*a* and 118*b*. The secondary-transfer belt 118 moves in a direction of an arrow C by rotation of the conveying rollers 118*a* and 118*b*. An recording medium 124, such as a high-quality paper sheet or a plastic sheet, is fed from the image-receiving-medium containing unit 128, such as a sheet cassette, to the secondary transfer unit by the conveying roller 126. The recording medium 124 is conveyed on the secondary-transfer belt 118 in synchronization with the full-color toner image on the intermediate transfer belt 114.

When the full-color toner image on the intermediate transfer belt 114 comes to the secondary transfer unit in accordance with the movement of the intermediate transfer belt 114, the full-color toner image is transferred onto the recording medium 124 on the secondary-transfer belt 118 because of a secondary-transfer bias that is applied to the secondary-transfer belt 118. The recording medium 124 with the full-color toner image on it surface is conveyed to the fixing unit 120 in accordance with the movement of the secondary-transfer belt 118. The fixing unit 120 includes a fixing member 130, such as a fixing roller made of silicon rubber or fluorine-contained rubber. The fixing member 130 applies heat and pressure to the recording medium 124, whereby the full-color toner image is fixed on the recording medium 124. After that, the fixing unit 120 outputs the recording medium 124 as a printed material 132 to outside the image forming apparatus 100. After the full-color toner image on the intermediate transfer belt 114 is transferred onto the recording medium 124, the cleaning unit 116 including a cleaning blade removes residual toners from the intermediate transfer belt 114 so that the intermediate transfer belt 114 is ready for a next image forming process.

Incidentally, one sub-scanning misalignment detecting unit (not shown) is provided near a main-scanning end point of each of the photosensitive drums 104*a*, 106*a*, 108*a*, and 110*a* in the main scanning direction. Each of the sub-scanning misalignment detecting units detects a misalignment in the sub scanning direction.

FIG. 2 is a plan view of the optical device 102 viewed from a direction of an arrow A shown in FIG. 1. The photosensitive drum 104*a* from among the photosensitive drums is illustrated in FIG. 2 to explain how a laser beam is emitted to the photosensitive drum 104*a* to form an electrostatic latent image. As shown in FIG. 2, the optical device 102 further includes a VCSEL controller (hereinafter, "a GAVD") 200, a driver 206, a drive-current control unit 204, a voltage converting unit 202, a VCSEL 208, a coupling optical element 210, an aperture 211, an optical separating unit 212, a total reflection mirror 214, a second collective lens 216, and a photoelectric converting element 218.

The GAVD 200 includes an application specific integrated circuit (ASIC), and controls the VCSEL 208. Specifically, upon receiving a control signal from a main central processing unit (CPU) (not shown in FIG. 2), the GAVD 200 instructs a drive control of the VCSEL 208. Incidentally, the main CPU controls an image formation by the image forming apparatus 100. Furthermore, in response to a command from the main CPU, the GAVD 200 issues a signal to the signal to the VCSEL 208. The signal can be a factory-setting adjustment signal, an initialization signal, a line automatic power control (APC) signal, or a sheet-interval APC signal. The term "line APC" indicates a control for correcting a light intensity of a laser beam at a timing of each laser-beam scanning in the main scanning direction while the image forming apparatus 100 is running. The term "sheet-interval APC" indicates a control for correcting a light intensity of a laser beam in the intervals between continuously-fed sheets (hereinafter, "the sheet interval") by a different method from that of the line APC.

The sheet-interval APC is specifically explained below. For example, as shown in FIG. 3, when an intermediate transfer belt moves in a conveying direction B, a photosensitive drum K is exposed to an optical beam L thereby forming a first toner image that will be transferred onto a sheet P1. After that, the photosensitive drum K is further exposed to an optical beam L thereby forming a second toner image that will be transferred onto a subsequent sheet P2. In an interval INT between the exposures of the photosensitive drum K, a light intensity of a laser beam is controlled by the sheet-interval APC.

Returning to the explanation of FIG. 2, the driver 206 supplies a drive current to the VCSEL 208. Specifically, upon receiving a control signal from the GAVD 200, the driver 206 activates the VCSEL 208 by supplying a drive current to the VCSEL 208 so that the VCSEL 208 emits laser beams. It is assumed that the VCSEL 208 emits forty laser beams assigned to forty channels, respectively. However, the number of laser beams emitted by the VCSEL 208 is not limited to forty.

The laser beams are formed into parallel beams by the coupling optical element 210, and a wavefront of the laser beams is shaped by the aperture 211. The shaped laser beams are separated into a monitor beam and a scanning beam by the optical separating unit 212. The optical separating unit 212 includes a half mirror coated with a dielectric multilayer or the like. The scanning beam is deflected by the polygon mirror 102c, and emitted to the photosensitive drum 104a through the f-theta lens 102b. Incidentally, a synchronous detecting unit 220 including a photo diode (PD) is provided near a scanning start point of the photosensitive drum 104a. The synchronous detecting unit 220 detects the laser beam, and outputs a synchronization signal indicating a timing of each control process including a first light-intensity correction.

Figure 5A:
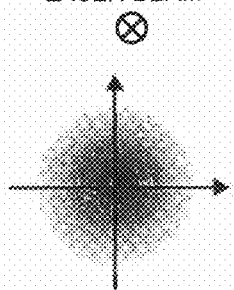
FIG. 5A is a cross-section view of an example of a laser beam before the laser beam is shaped by the optical separating unit.
Figure 5B:
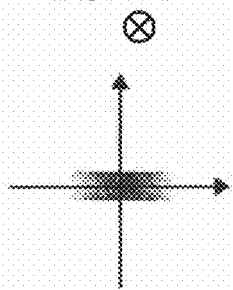
FIG. 5B is a cross-section view of the laser beam after the laser beam is shaped by the optical separating unit.
Figure 5C:
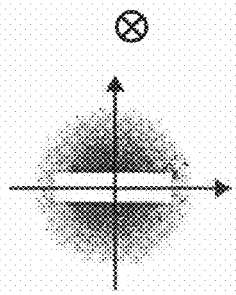
FIG. 5C is a cross-section view of the laser beam that does not pass through the optical separating unit.

Instead of the half mirror, the optical separating unit 212 can include a light reflection member as disclosed in Japanese Patent Application Laid-open No. 2007-298563 (hereinafter, "an aperture mirror"). The aperture mirror allows passage of some of beams through an aperture, and reflects the other beams from a portion other than the aperture. FIG. 4 is a schematic diagram of the optical separating unit 212, which is the aperture mirror, viewed from the side facing to a traveling direction of a laser beam. The optical separating unit 212 shown in FIG. 4 includes an aperture 212a and a light reflecting portion 212b. A laser beam that passes through the aperture 211 is shaped because of the aperture 212a. FIG. 5A is a cross-section view of an example of a laser beam which cross-section surface has a substantially round shape. FIG. 5B is a cross-section view of the laser beam shaped by passing through the aperture 212a. FIG. 5C is a cross-section view of the laser beam that does not pass through the aperture 212a. In a conventional technology, such a beam that does not pass through an aperture as shown in FIG. 5C is discarded. However, in the optical separating unit 212 including the aperture mirror, the laser beam shown in FIG. 5C is reflected by the light reflecting portion 212b, and such a reflected beam is used as a monitor beam. The laser beam passing through the aperture 212a shown in FIG. 5B is used as a scanning beam. In this manner, when the optical separating unit 212 includes the aperture mirror, unlike a case of the half mirror, the optical separating unit 212 needs not separate a laser beam into a monitor beam and a scanning beam, and uses a light intensity of a laser beam used to be discarded. Therefore, it is possible to reduce an amount of luminescence from the VCSEL 208 as compared with that is in the case of the half mirror. Furthermore, in a case of the aperture mirror, the aperture 211 is not required.

Figure 6A:
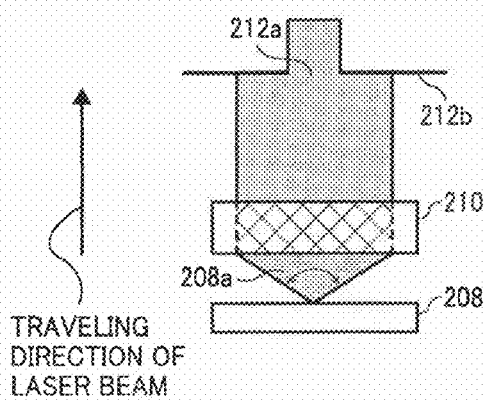
FIGS. 6A and 6B are schematic diagrams for explaining how a ratio of an area of a beam passing through an aperture and an area of a beam reflected by a light reflecting portion varies depending on a beam spread angle.
Figure 6B:
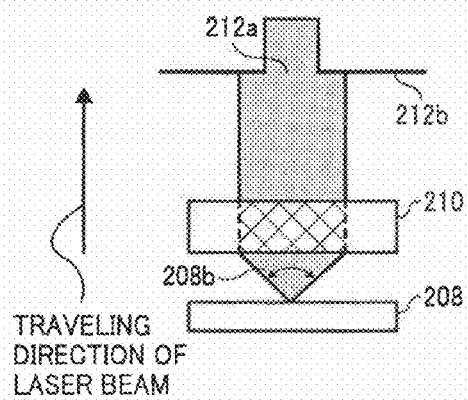

With respect to a ratio of a scanning beam and a monitor beam that a laser beam is separated thereinto by the optical separating unit 212, the half mirror can keep the ratio constant. However, in the case of the aperture mirror, the ratio varies depending on a beam spread angle, i.e., a degree of beam spread from a light-emitting point of a laser light. FIGS. 6A and 6B are schematic diagrams for explaining how a ratio of an area of a beam passing through the aperture 212a and an area of a beam reflected by the light reflecting portion 212b varies depending on a beam spread angle. In a case shown in FIG. 6A, a beam 208a has a relatively wide beam spread angle, and a ratio of an area of the beam 208a passing through the aperture 212a and an area of the beam 208a reflected by the light reflecting portion 212b is, for example, 5 to 5. In a case shown in FIG. 6B, a beam 208b has a relatively narrow beam spread angle, and a ratio of an area of the beam 208b passing through the aperture 212a and an area of the beam 208b reflected by the light reflecting portion 212b is, for example, 7 to 3. Even when laser beams are emitted from the same VCSEL, each laser beam by each channel has a different beam spread angle from one another, so that such a separation ratio differs among the channels. A measure against this problem will be explained later in a practical example in which a monitor voltage is recorded in a memory. Incidentally, hereinafter, it is assumed that the optical separating unit 212 includes not the half mirror but the aperture mirror.

As described above, the laser beam reflected by the light reflecting portion 212b is used as a monitor beam. Returning to the explanation of FIG. 2, the monitor beam is further reflected to the second collective lens 216 by the total reflection mirror 214. The monitor beam is emitted to the photoelectric converting element 218 through the second collective lens 216. The photoelectric converting element 218 generates a monitor voltage Vpd corresponding to a light intensity of the monitor beam, and outputs the generated monitor voltage Vpd to the voltage converting unit 202. The monitor voltage Vpd is further output from the voltage converting unit 202 to the drive-current control unit 204. The drive-current control unit 204 calculates a VCSEL control value based on the light intensity of the monitor beam, and outputs the calculated VCSEL control value to the GAVD 200. Upon receiving the VCSEL control value, for example, an 8-bit VCSEL control value, the GAVD 200 outputs the VCSEL control value to the driver 206, and the driver 206 controls a drive current based on the VCSEL control value. Incidentally, the voltage converting unit 202 and the drive-current control unit 204 can be configured as a different module from each other, or can be integrally configured as a microcontroller including a read-only memory (ROM) and a random access memory (RAM) for storing therein each control value used for each process.

Figure 7:
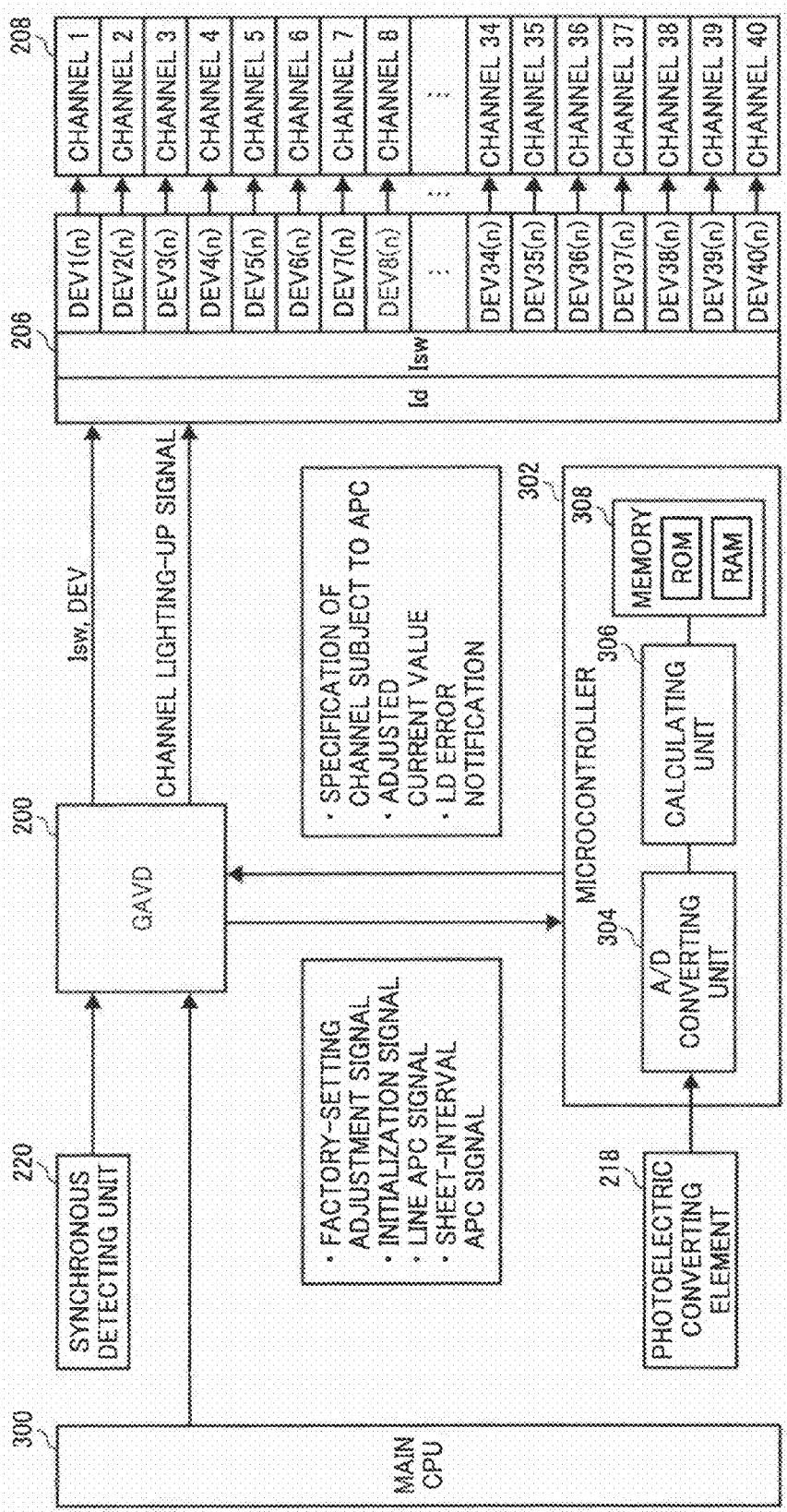
FIG. 7 is a detailed block diagram of a drive circuit of a VCSEL shown in FIG. 2.

FIG. 7 is a detailed block diagram of a drive circuit of the VCSEL 208. Upon receiving a control signal from a main CPU 300, the GAVD 200 starts performing a factory-setting adjustment, an initialization setting, and an operation control of the synchronous detecting unit 220. In the example shown in FIG. 7, the voltage converting unit 202 and the drive-current control unit 204 are integrally configured as a microcontroller 302. The microcontroller 302 includes an analog-to-digital (A/D) converting unit 304 corresponding to the voltage converting unit 202, a calculating unit 306 corresponding to the drive-current control unit 204, and a memory 308. The memory 308 includes a ROM area and a RAM area. Control values used for the calculation by the calculating unit 306 are stored in either the ROM area or the RAM area. Specifically, data on the factory default setting and the like are stored in the ROM area. A part of the RAM area is used as a register memory in which each value required for each process is stored.

In response to a command from the GAVD 200, the microcontroller 302 performs the initialization setting based on the data on the factory default setting and a light intensity of each of laser beams, and stores the initialization-set value in the register memory. After that, in response to a command from the GAVD 200, the microcontroller 302 calculates a value for the operation control, and updates control data of the VCSEL 208 stored in the register memory, and performs controlling a light intensity of each of the laser beams emitted from the VCSEL 208 depending on a continuous running of the VCSEL 208 and an environmental fluctuation on the image forming apparatus 100.

The microcontroller 302 outputs a VCSEL control value to the GAVD 200. The VCSEL control value is input as a correction value calculated based on an initially-set current value to the driver 206 together with a channel lighting-up signal. The driver 206 performs a pulse width modulation (PWM) conversion of the received correction value, and sets a drive current. Then, the driver 206 supplies a current of the same level as the drive current to a channel specified in the channel lighting-up signal so that the current is fed back to a light intensity of a laser beam assigned to the specified channel of the VCSEL 208.

The driver 206 performs a PWM control of the VCSEL 208 based on a threshold current "Ib", a common current "Isw", and a correction value "DEVi". The threshold current Ib and the common current Isw are in common among all channels that are respectively assigned to laser diode elements, i.e., laser beams emitted from the VCSEL 208. The correction value DEVi is not in common among all the channels, i.e., the correction value DEVi is different by each laser diode element. Incidentally, "i" indicates the number of the channel. In the embodiment, any of the channel numbers 1 to 40 is suffixed to "DEV".

Figure 8:
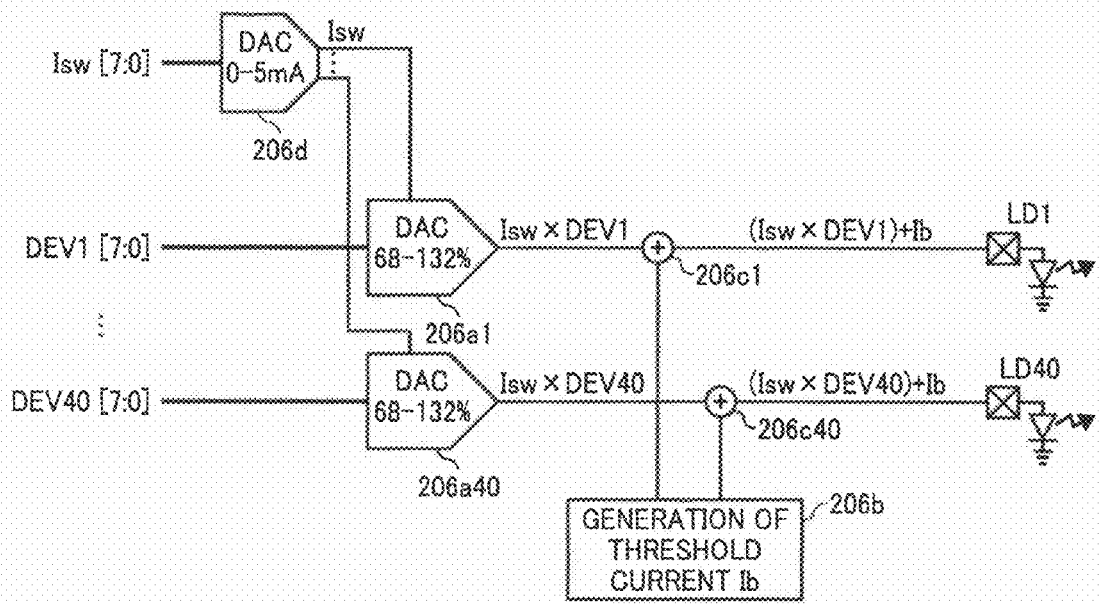
FIG. 8 is a schematic diagram of a driver shown in FIG. 2.

FIG. 8 is a schematic diagram of the driver 206. The driver 206 includes a correction-value setting unit 206a, a bias-current setting unit 206b, an LD-current supplying unit 206c, and a common-current supplying unit 206d. The correction-value setting unit 206a and the LD-current supplying unit 206c are provided in each of laser diode elements "LD". The common-current supplying unit 206d supplies a common current Isw to each of the correction-value setting units 206a. Each of the LD-current supplying units 206c supplies a current that a threshold current Ib set by the bias-current setting unit 206b is added to a current value set by each of the correction-value setting units 206a to the corresponding laser diode element LD.

As described above, the correction-value setting unit 206a and the LD-current supplying unit 206c are provided in each of the laser diode elements LD, and forty channels are respectively assigned to the laser diode elements LD. Therefore, as shown in FIG. 8, any of the channel numbers 1 to 40 is suffixed to reference numerals of the correction-value setting units 206a and the LD-current supplying units 206c, and reference characters of the laser diode elements LD. The common-current supplying unit 206d can set up a common current within a range of 0 megampere (mA) to 5 mA with an 8-bit digital-to-analog converter (DAC) (Isw [7:0]).

Each of the correction-value setting units 206a sets a correction value DEV of the corresponding channel with respect to the supplied common current. The correction-value setting unit 206a can correct the common current Isw to be either increased or decreased in a range of 68% to 132%. Such a correction value is set by the DAC (DEV [7:0]). The bias-current setting unit 206b supplies the threshold current Ib that is preliminarily set by the driver 206, for example, 3 mA to each of the channels. The driver 206 can supply a drive current of a value obtained by "Isw×DEVi+Ib" to each of the laser diode elements LDi ("i" indicates the channel number, i.e., an integer of any of 1 to 40).

Figure 9:
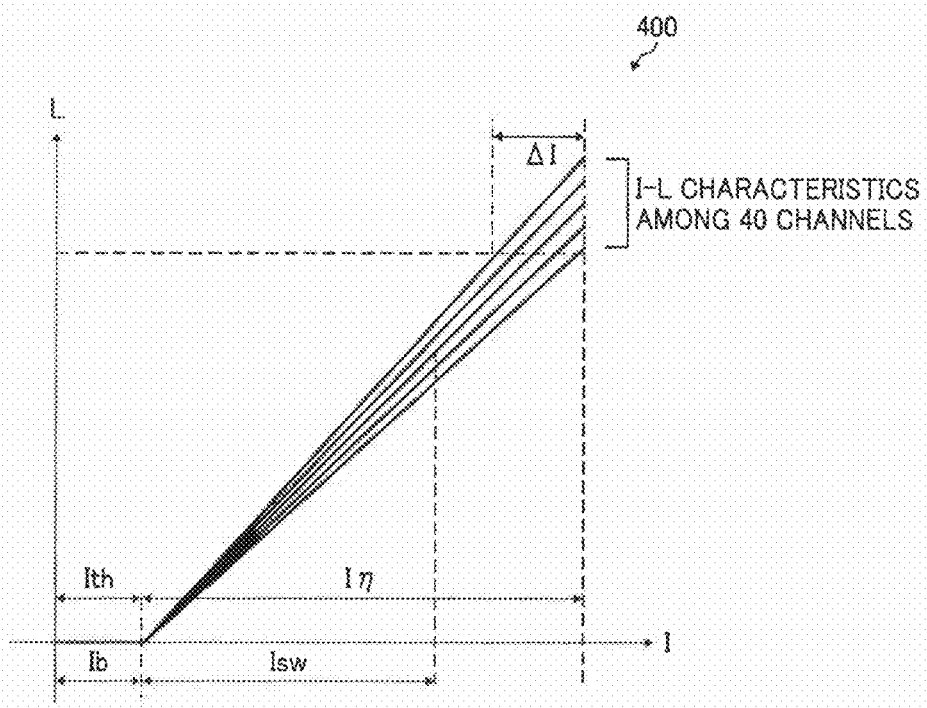
FIG. 9 is a graph of output characteristics of laser beams emitted from the VCSEL.

FIG. 9 is a graph of output characteristics (hereinafter, "I-L characteristics") 400 of laser beams emitted from the VCSEL 208. In the graph, "I" denotes a current level, and "L" denotes an output of a laser beam. It is assumed that the VCSEL 208 is composed of forty laser diode elements that the channels 1 to 40 are respectively assigned thereto. Each of the laser diode elements has the threshold current Ib used for lasing. Depending on characteristics of the laser diode elements, the I-L characteristic differ among the laser diode elements. To provide a laser beam having the same light intensity to each of the laser diode elements, a drive current $I\eta$ is different by an amount $\Delta I$ even at the time of initial setting.

FIG. 10 is a table of control data 500 for the VCSEL 208. As shown in FIG. 10, the control data 500 includes control values by each of the channels 1 to 40 (see a column 502), and is stored in the ROM area and the RAM area of the memory 308 in the microcontroller 302. Specifically, in the ROM area, a monitor voltage Vpd(0) and an initialization current Isw(0) those are factory default values are stored. The monitor voltage Vpd(0) is an output voltage from the photoelectric converting element 218 when a scanning beam having a predetermined light intensity is emitted. As described above, when the optical separating unit 212 including the aperture mirror is used, even though a scanning beam of each of the channels has the same light intensity, a separation ratio of a scanning beam and a monitor beam by the optical separating unit 212 is different by each channel, and thus a monitor voltage to be obtained is different by each channel. Therefore, different monitor voltages Vpdi(0) by each channel are stored in the ROM area so as to even out fluctuations in the separation ratio among the channels. The initialization current Isw(0) is a median value (an average of the maximum value and the minimum value) of a current value Iswi obtained at the time of factory default setting. The current value Iswi is a current enabling a laser beam having the predetermined light intensity to be provided to each of the laser diode elements. The initialization current Isw(0) is a current used to provide a monitor light intensity when an initialization light intensity is to be controlled.

On other hand, in the RAM area, a common current Isw(1) (see a column 508) and a current correction value DEVi(0) (see a column 510) are stored in an associated manner. The common current Isw(1) is a drive current used to cause each of the laser diode elements assigned to the channels provided by the default setting to provide a laser beam of the predetermined light intensity while the image forming apparatus 100 performs an image forming process. A relation between the common current Isw(m) and the current correction value DEVi(n) can be expressed by the following Equation (1). As shown in Equation (1), the common current Isw(m) and the current correction value DEVi(n) are calculated by using values provided by the default setting, i.e., values that are set depending on characteristics of the photoelectric converting element and the laser diode elements and preliminarily stored in the ROM area as factory default values.

$$Isw(m)=\{DEVi(n)\_max+DEVI(n)\_min\}\times Isw(m-1)/2$$

$$DEVi(n)=[Vpdi(0)/Vpdi(n)]\times DEVi(n-1) \qquad (1)$$

Incidentally, "m" and "n" respectively indicate an integer of 1 or more, and are used not to register the specific number of times but to explain a process of calculating a correction value. Furthermore, it is assumed that under a condition of "n=1", a current correction value DEVi(0) is 1. Moreover, the initialization current Isw(0) is the factory default value, and "DEVi(n)_max" and "DEVi(n)_min" respectively indicate the maximum value and the minimum value of current correction values DEVi(n) among the currently-set channels (see a column 506). In addition, each of the monitor voltages "Vpdi(0)" is an output voltage from the photoelectric converting element 218 at the time of the default setting, and can be stored in an appropriate address of the register memory in the microcontroller 302 (see a column 504).

The relation between the common current Isw(m) and the current correction value DEVi(n) is applicable when I-L characteristics of correction values are in a state shown in FIG. 11. As shown in FIG. 11, when a laser beam having the predetermined light intensity is output, an output voltage from the photoelectric converting element 218 is identical to the monitor voltage Vpdi(0). At the time of the line APC, if it is detected that an output voltage from the photoelectric converting element 218 is a voltage of Vpdi(n), it is determined that the light intensity of the laser beam is decreased. Therefore, a correction value DEVi(n) is calculated, and the calculated correction value DEVi(n) is notified to the GAVD 200. Upon receiving the correction value DEVi(n), the GAVD 200 outputs the corresponding channel number and the correction value DEVi(n) to the driver 206.

The driver 206 creates a PWM signal based on the received channel number and the correction value DEVi(n), and supplies a drive current to the laser diode element corresponding to the received channel number. In the present embodiment, a correction value DEVi(n) is set by an 8-bit resolution, and a current Isw is set to be variable, for example, in a range of 68% to 132%.

Subsequently, the factory setting is explained in detail below. At the factory, each monitor voltage by each of the channels of the VCSEL 208, which is output from the photoelectric converting element 218 when a surface of the photosensitive drum is exposed to a laser beam of the predetermined light intensity, is recorded in the microcontroller 302 by using a ROM writer. An optical sensor is provided at a position facing to the surface of the photosensitive drum so as to measure a light intensity of the laser beam and obtain a correlation between the light intensity of the laser beam and the monitor voltage. The optical sensor is connected to a personal computer (PC). The PC controls the GAVD 200. A factory-setting adjustment signal is transmitted from the PC to the calculating unit 306 via the GAVD 200.

The microcontroller 302 outputs an operation enable signal of a channel subject to the factory-setting adjustment first (hereinafter, assumed as the channel 1) to the driver 206 via the GAVD 200, and then causes a drive current Iswi to be gradually increased. When the optical sensor detects that a light intensity of a laser beam assigned to the channel 1 reaches the predetermined light intensity, the optical sensor notifies the PC that the light intensity of the laser beam assigned to the channel 1 reaches the predetermined light intensity. The PC notifies the microcontroller 302 via the GAVD 200 that the light intensity of the laser beam assigned to the channel 1 reaches the predetermined light intensity. Upon receiving the notification from the PC, the microcontroller 302 records an output voltage Vpd1 from the photoelectric converting element 218 in the ROM area of the memory 308. At the same time, the microcontroller 302 records a current value Isw1 in the RAM area (nonvolatile random access memory (NVRAM)) of the memory 308. Contents of data as shown in FIG. 10 are recorded in the memory 308. Such a process is performed by each of the channels 1 to 40. After data for the channel 40 as the last channel is recorded in the memory 308, the PC calculates a median value Isw(0) of the current values Isw1 to Isw40, and writes the calculated median value Isw(0) in the ROM area of the memory 308.

Subsequently, an initialization process of the image forming apparatus 100 is explained in detail below. When a user uses the image forming apparatus 100, the initialization process is performed at a start-up time or an operation start time of the image forming apparatus 100. The initialization process is performed before the photosensitive drum is exposed to laser beams emitted from the VCSEL 208. The initialization process is a process of calculating a correction value DEVi(n) for each of the channels 1 to 40 of the VCSEL 208. FIG. 12 is a flowchart of the initialization process. The initialization process is started when a user powers ON the image forming apparatus 100 or an image forming process is performed upon receipt of an image forming command from the user in the automatic mode (Step S700). First, an initialization signal is transmitted from the main CPU 300 to the GAVD 200. Upon receiving the initialization signal from the main CPU 300, the GAVD 200 notifies the microcontroller 302 of the receipt of the initialization signal. Upon receiving the notification from the GAVD 200, the microcontroller 302 outputs the channel number of the VCSEL 208 subject to the initialization process first (for example, the channel 1) and the initialization current Isw(0) stored in the ROM area of the memory 308 as the factory default value to the driver 206 via the GAVD 200 (Step S701).

Then, the GAVD 200 lights up the channel 1 for a predetermined time by using a common drive current "Isw(0)× DEV1(1)=100% (i.e., a correction value is 0)" in synchronization with a synchronous detection signal (hereinafter, "a DETP signal") from the synchronous detecting unit 220 (Step S702). While the channel 1 is lit up for the predetermined time, the microcontroller 302 acquires a monitor voltage Vpd1(1) via the A/D converting unit 304 (Step S702). Then, the microcontroller 302 calculates a correction value DEV1(1) for the channel 1 based on the acquired monitor voltage Vpd1(1) and an output voltage Vpd1(0) from the photoelectric converting element 218 when a laser beam having the predetermined light intensity is output, which is stored in the ROM area as factory default value (Step S703). Incidentally, the output voltage Vpd1(0) is stored in the ROM area, and used as a default value. The correction value DEV1(1) is calculated by using Equation (1) under the condition of "n=1".

It is determined whether the initialization process for all the channels 1 to 40 is completed (Step S704). If the initialization process for all the channels is not completed (NO at Step S704), the process control returns to Step S701 until a correction value DEV40(1) for the channel 40 as the last channel is obtained. If the initialization process for all the channels is completed (YES at Step S704), the initialization process is completed (Step S705). Incidentally, the calculated correction values DEVi(1) for all the channels are used as a reference value for determining whether there is any change between the correction values DEVi(1) and that is obtained in a next initialization process as shown in Equation (1), so that the calculated correction values DEVi(1) are stored in the RAM area of the memory 308.

Figure 13:
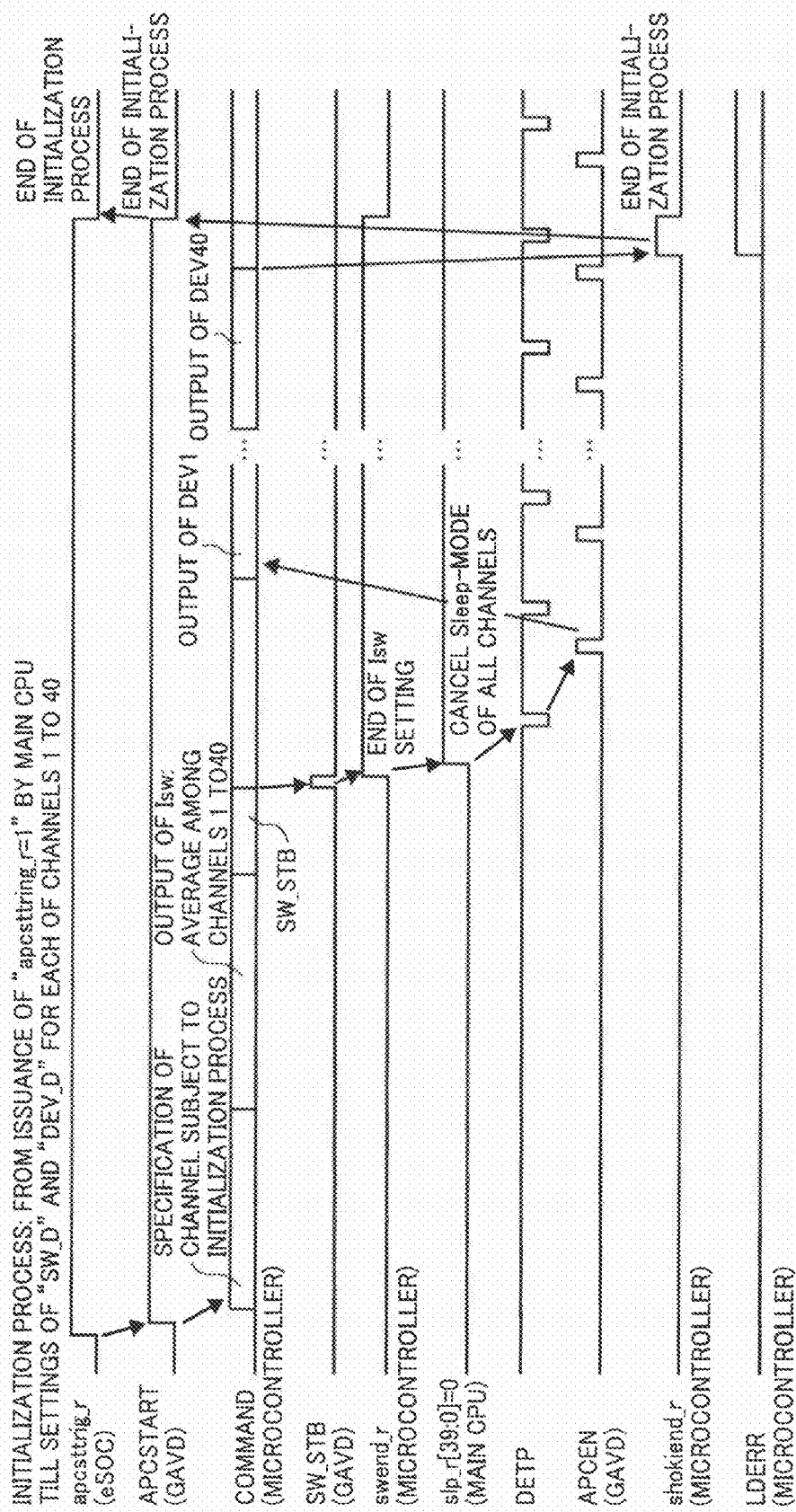
FIG. 13 is a timing chart of a process performed by a microcontroller in the initialization process.

FIG. 13 is a timing chart of a process performed by the microcontroller 302 in the initialization process. In the initialization process, the main CPU 300 issues an assertion of "apcsttrig_r" (i.e., "apcsttrig_r=high" in the embodiment), which is a notification of start of the initialization process, and outputs the notification to the GAVD 200. The initialization process is started at the point when the GAVD 200 asserts "APCSTART" as a line APC signal upon receiving the notification from the main CPU 300. Upon receiving the "APC- START" from the GAVD 200, the microcontroller 302 outputs the number of the channel subject to the initialization process, the initialization current Isw(0), and a command such as a strobe signal "SW_STB" to the GAVD 200. The GAVD 200 outputs the strobe signal "SW_STB" to the driver 206, whereby a current Isw that the driver 206 has previously been received, i.e., the initialization current Isw(0) in this case is determined.

After the strobe signal "SW_STB" is output, the microcontroller 302 asserts "swend_r" indicating an end of setting data on the initialization current Isw(0), and notifies the main CPU 300 of the end of setting of the initialization current Isw(0). The main CPU 300 asserts "slp_r" as an enable command signal for the laser diode elements. Upon receiving the enable command signal "slp_r" from the main CPU 300, the GAVD 200 instructs the driver 206 to cancel the Sleep-mode of all the channels. After that, when the GAVD 200 detects a synchronous detection signal from the synchronous detecting unit 220, the GAVD 200 outputs a signal "ACPEN" as an APC enable command to the microcontroller 302.

Upon receiving the signal "ACPEN", the microcontroller 302 calculates a correction value DEVi(1). After the calculation of the correction value DEVi(1), the microcontroller 302 outputs data "DEV_D" that is data on the correction value DEVi(1). Such a process is repeatedly performed by each of the channels until data DEV_D for the channel 40 has been output. When the data DEV_D for the channel 40 has been output, the microcontroller 302 outputs "shokiend_r" indicating an end of the initialization process for all the channels to the GAVD 200. Furthermore, if the microcontroller 302 is notified of an occurrence of an error in any of the laser diode elements, the microcontroller 302 issues an error signal "LDERR". The error signal "LDERR" will be explained in detail later.

After the initialization process is completed, the microcontroller 302 outputs the calculated correction value DEV1(1) to the driver 206 via the GAVD 200. Upon receiving the correction value DEV1(1), the driver 206 sets a control voltage, and also sets a drive current to be supplied to the channel 1 to a current of "Isw(0)×DEV1(1)". As a result, a light intensity of a laser beam emitted from the laser diode element assigned to the channel 1 can be controlled, for example, by a PWM control or the like to the predetermined light intensity as the factory default value.

Subsequently, an image forming process performed by the image forming apparatus 100 is explained in detail below.

The image forming apparatus 100 starts performing the image forming process by using a correction value DEVi(1) determined in the initialization process. The image forming apparatus 100 can perform the image forming process by a conventional image forming method. Namely, a static electric charge is applied to the photosensitive drum. The laser diode exposes the photosensitive drum to a laser beam, and thereby forming an electrostatic latent image on the photosensitive drum. The electrostatic latent image is developed into a toner image. The toner image is transferred onto a sheet, and fixed thereon. Then, the image-printed sheet is discharged from the image forming apparatus 100.

Figure 14:
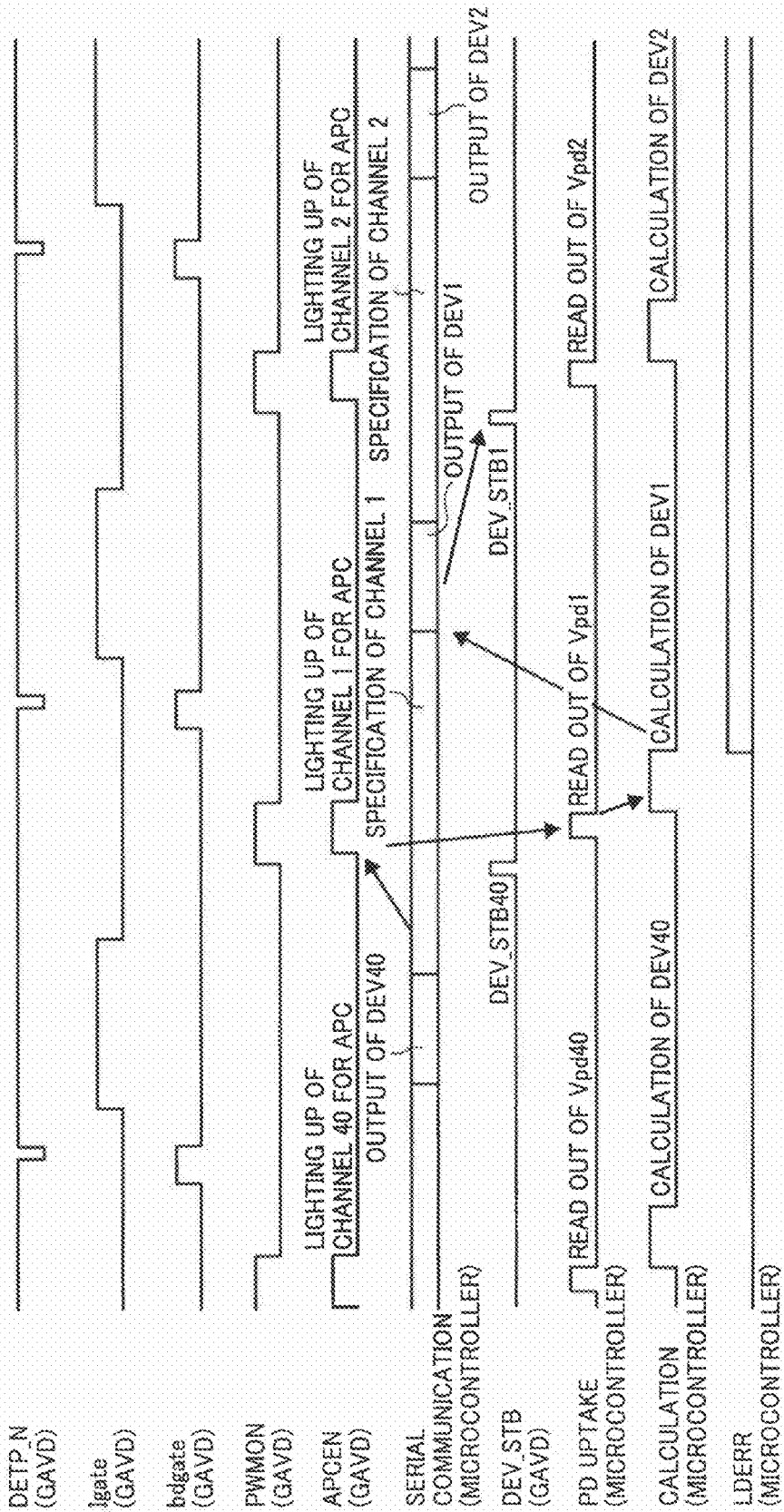
FIG. 14 is a timing chart of a line APC performed by a GAVD and the microcontroller.

The image forming apparatus 100 performs the image forming process with controlling a light intensity of the laser beam by a line APC method depending on an environmental fluctuation. The line APC indicates the calculation of a correction value DEVi and the control of a light intensity of a laser beam based on the correction value DEVi those performed after the initialization process. The line APC is performed by each line scan in the main scanning direction in synchronization with a DETP signal. FIG. 14 is a timing chart of the line APC performed by the GAVD 200 and the microcontroller 302. Incidentally, to explain the continuous line APC, the timing chart shown in FIG. 14 is started from an end of the measurement for the channel 40 in the previously-performed line APC. As shown in FIG. 14, upon receiving a synchronous detection signal "DETP_N" from the synchronous detecting unit 220, the GAVD 200 sets a gate "1 gate" for data acquisition. After that, the GAVD 200 issues a signal "PWMON", and further issues a signal "APCEN" for the channel 40 so as to cause the laser diode element assigned to the channel 40 to generate a monitor beam.

In this time, the microcontroller 302 calculates a correction value DEV40($n$). After the calculation of the correction value DEV40($n$), the microcontroller 302 transmits the correction value DEV40($n$) to the GAVD 200 via serial communication. Upon receiving the correction value DEV40($n$) from the microcontroller 302, the GAVD 200 outputs a strobe signal "DEV_STB40" to the driver 206 so as to set the correction value DEV40($n$) in the driver 206. After that, when the GAVD 200 receives a synchronous detection signal from the synchronous detecting unit 220, the microcontroller 302 specifies the channel 1, and reads out an output voltage Vpd($n$+1), and then calculates a correction value DEV1($n$+1). The microcontroller 302 outputs the calculated correction value DEV1($n$+1) to the GAVD 200 via the serial communication. Upon receiving the correction value DEV1($n$+1), the GAVD 200 outputs a strobe signal "DEV_STB1" to the driver 206 so as to set the correction value DEV1($n$) in the driver 206. If the output voltage Vpd($n$+1) is not be detected, the microcontroller 302 issues an error signal "LDERR" indicating that an error occurs in the laser diode element assigned to the channel 1.

Figure 15:
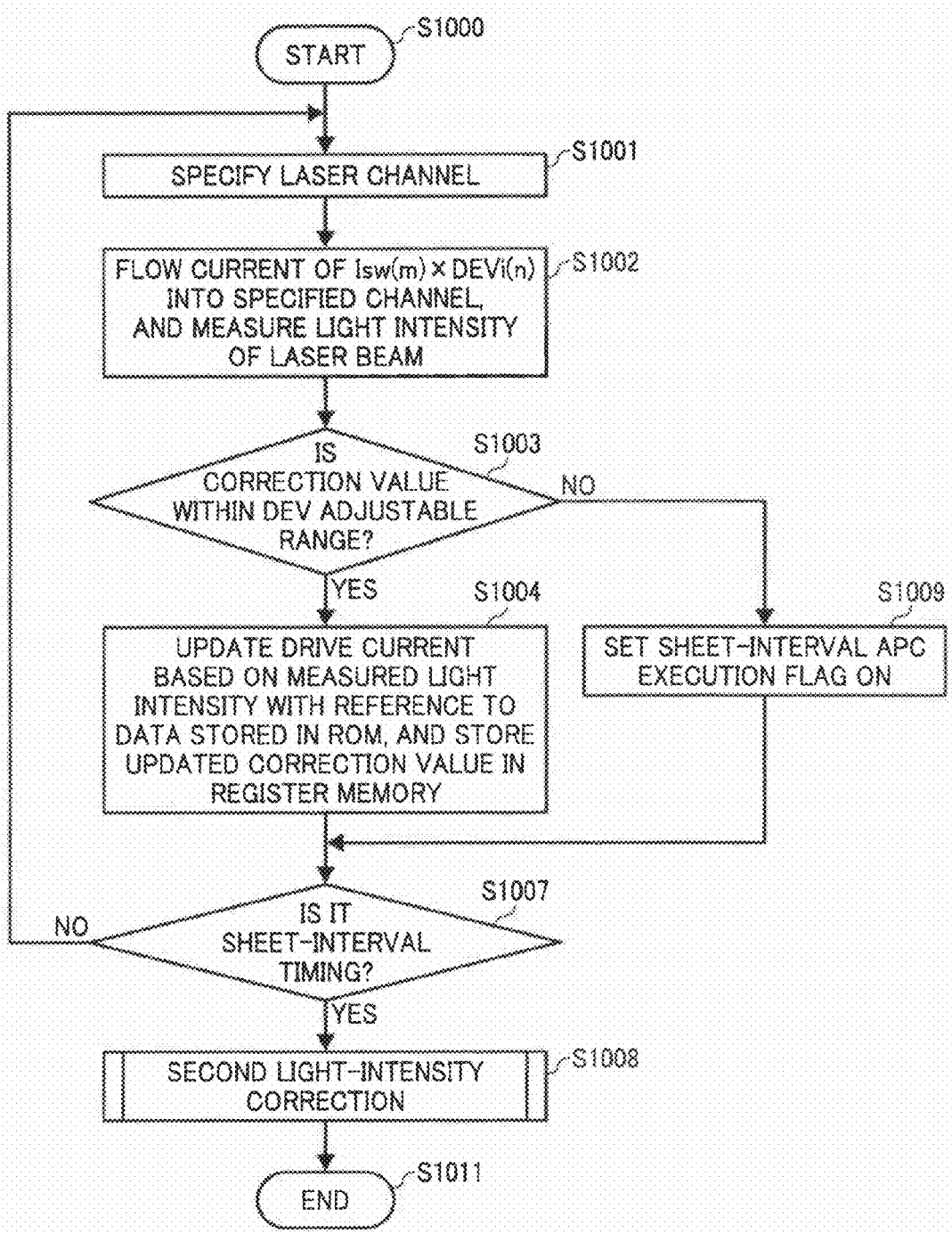
FIG. 15 is a flowchart of an image forming process performed by the image forming apparatus.

FIG. 15 is a flowchart of the image forming process performed by the image forming apparatus 100. The image forming apparatus 100 forms an image on a high-quality paper sheet or a plastic sheet (hereinafter, just "a sheet") which size is generally any of B5, A4, B4, and A3 sizes. During the line APC, when the image forming apparatus 100 continuously forms an image on a relatively large number of sheets, temperatures in the image forming apparatus 100 and the optical device 102 are increased. As a result, it may fail to correct a light intensity of a laser beam with a correction value DEV within an adjustable range (hereinafter, "a DEV adjustable range") (in this case, within the DEV adjustable range of 68% to 132%).

Figure 16:
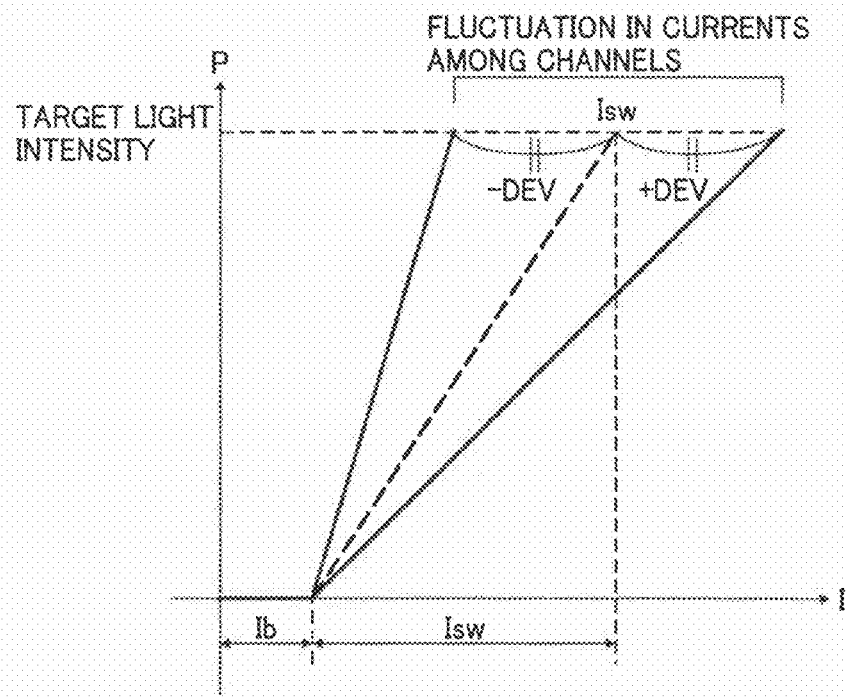
FIG. 16 is a graph for explaining an example of states of a common current and the correction value just after the initialization process.
Figure 17:
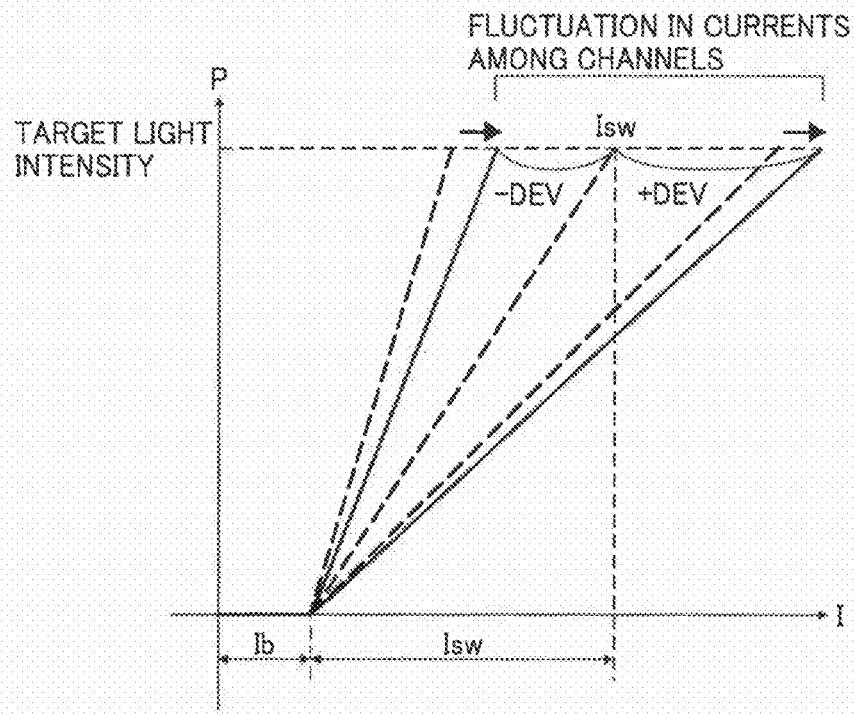
FIG. 17 is a graph for explaining a change of a current value of each of channels when a temperature of the VCSEL increases.
Figure 18:
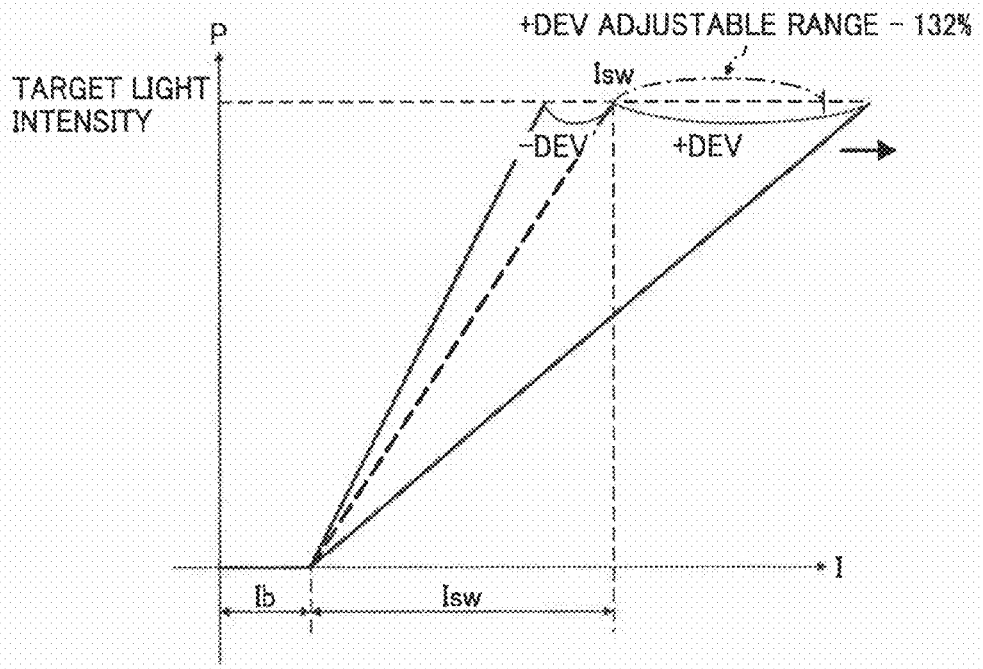
FIG. 18 is a graph for explaining a change of a current value of each of the channels when the current value exceeds a DEV adjustable range due to the increase of the temperature of the VCSEL.

Specifically, when a current Isw and a correction value DEV just after the initialization process are in a state shown in FIG. 16, the current Isw is located in the middle of a fluctuation range of currents among the channels. In other words, the fluctuation range is equally divided into "−DEV" and "+DEV" at a point of the current Isw. When the image forming apparatus 100 starts a printing job, a temperature in the optical device 102 is increased, and a temperature of the VCSEL 208 is also increased with the increase of the temperature in the optical device 102. Due to the increase of the temperature of the VCSEL 208, a graph of currents flown into the channels shown in FIG. 16 changes to that is shown in FIG. 17, i.e., the currents flown into the channels are increased overall. When the image forming apparatus 100 continuously forms an image on a relatively large number of sheets, and the increase of the temperature is continued, as shown in FIG. 18, some of the currents exceed the +DEV adjustable range. As for the channels incapable of adjusting a light intensity to a target light intensity by the line APC, the light intensity is smaller than the target light intensity, whereby a faint image is output.

Therefore, if a current of any of the channels reaches an upper limit or a lower limit of the DEV adjustable range during the line APC, the common current Isw is changed. A value of the common current Isw to be changed is calculated by Equation (1) as described above. However, when a newly-calculated common current Isw is set in the driver 206, the correction values DEV for all the channels need to be reset based on the newly-calculated common current Isw. Thus, it is necessary to perform the line APC in accordance with the reset of the correction values DEV. In this case, there are 40 channels, so that 40 times of the line APC for all the channels need to be performed.

However, if such a change of the common current Isw and 40 times of the line APC are performed while an image is formed (i.e., while the photosensitive drums are exposed to laser beams corresponding to image data), a light intensity of each of the laser beams on the photosensitive drums varies from the predetermined light intensity while 40 times of the line APC are performed. As a result, an image output in this time has an abnormal concentration.

Therefore, the change of the common current Isw and the reset of the correction values DEV for the channels are performed in the sheet intervals, i.e., while no image is formed, and thereby preventing an image to be formed from being affected. In addition, it takes only a few milliseconds to change the common current Isw and reset the correction values DEV for the channels, corresponding to 40 line scans of the laser beams in the main scanning direction, so that the sheet intervals need not to be widely spaced. Therefore, it is possible to change the common current Isw and reset the correction values DEV for the channels with keeping the high productivity.

In the above embodiment, when a current of any of the channels reaches the upper limit or the lower limit of the DEV adjustable range, the common current Isw is changed in a subsequent sheet interval. At this time, there is a possibility that the current further fluctuates by the subsequent sheet interval. In this case, it is not possible to correct the current because the current is already beyond the DEV adjustable range, and thus an error occurs in an image to be output.

Figure 19:
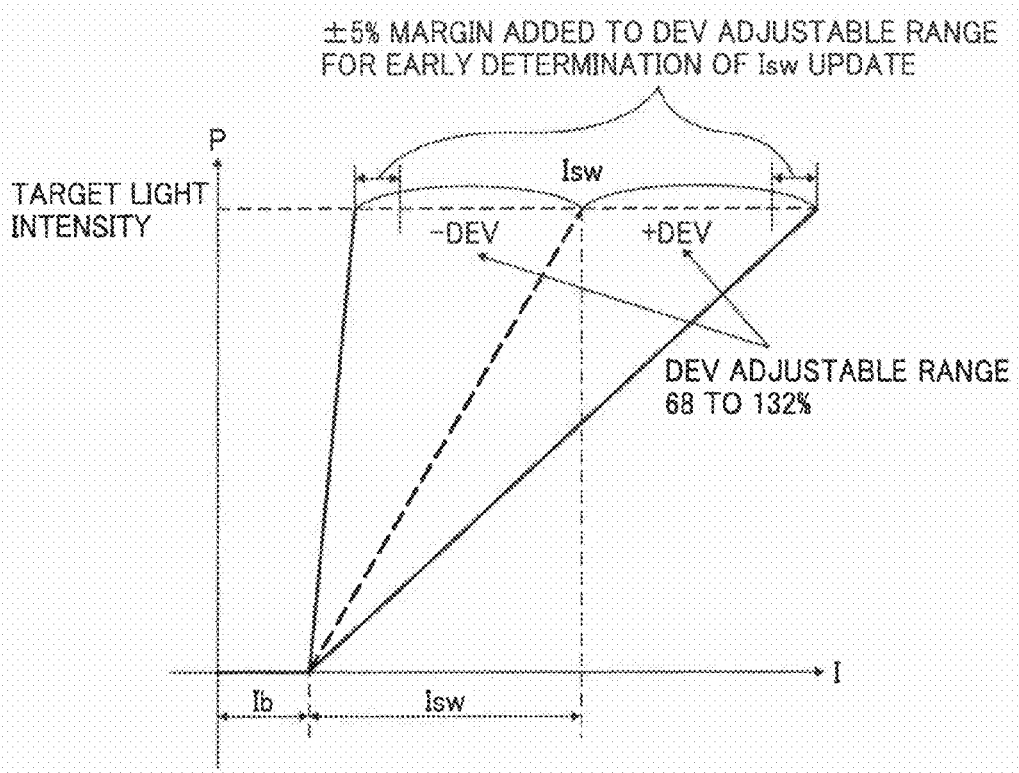
FIG. 19 is a graph for explaining an example of determining whether the common current is to be changed based on the DEV adjustable range to which a margin is added.

To cope with the problem, as another example, whether the common current Isw is to be changed is determined based on not the upper limit or the lower limit of the DEV adjustable range but a value that a margin is added to each of the upper limit and the lower limit. The margin is set to correspond to the maximum estimate value, i.e., the maximum current that may fluctuate in a time taken for printing one sheet. For example, +5% margin and −5% margin are respectively added to the upper limit and the lower limit of the DEV adjustable range (see FIG. 19). Therefore, even when the current further fluctuates by the subsequent sheet interval, the fluctuation in the current can be covered within the DEV adjustable range extended by the margin. Consequently, it is possible to prevent an occurrence of error in an image to be formed.

Furthermore, there is a possibility that a current of any of the channels reaches the upper limit or the lower limit of the DEV adjustable range or the value that the margin is added to each of the upper limit and the lower limit at the time of the initialization process of the VCSEL 208 because a drive current flown into each of the channels is increased due to an ambient temperature of the image forming apparatus 100 or the degradation of the VCSEL 208 caused by the prolonged use of the image forming apparatus 100. In this case, the sheet-interval APC is performed after the initialization process. The common current Isw is reset to a median value of drive currents among the channels before an image is formed, and thereby absorbing the increase of the drive current due to the ambient temperature or the degradation. Consequently, it is possible to achieve the prolonged use of the image forming apparatus employing the VCSEL.

To return to the explanation of the flowchart shown in FIG. 15, when the image forming process is started (Step S1000), a laser channel is specified (Step S1001). A current of "Isw(m)×DEVi(n)" is flown into the specified channel, and a light intensity of a laser beam assigned to the specified channel i is measured (Step S1002). A correction value DEVi for the light intensity of the laser beam is calculated, and it is determined whether the light intensity is corrected by the correction value DEVi, i.e., whether the correction value DEVi is within the DEV adjustable range (Step S1003). If it is determined that the correction value DEVi is within the DEV adjustable range (YES at Step S1003), the line APC as the first light-intensity correction is performed in accordance with the processes as shown in FIGS. 13 and 14. The corresponding correction value stored in the register memory is updated to the correction value DEVi (Step S1004).

On the other hand, if it is determined that the correction value DEVi is beyond the DEV adjustable range (NO at Step S1003), the process control goes to Step S1009. A sheet-interval APC execution flag is ON (Step S1009), and the process control goes to Step S1007. Incidentally, there are various methods to store the correction value DEVi beyond the DEV adjustable range. For example, there are a method of setting an out-of-range flag and a method of storing in a predetermined address of the register memory.

The GAVD 200 determines whether the main CPU 300 negates a sheet-interval signal "fgate" indicating a sheet-interval timing (Step S1007). If it is determined that the sheet-interval signal "fgate" is not negated (fgate=low), i.e., it is not the sheet-interval timing (NO at Step S1007), the process control returns to Step S1001, and a next laser channel is specified. On the other hand, if it is determined that the sheet-interval signal "fgate" is negated, i.e., it is the sheet-interval timing (YES at Step S1007), the process control goes to Step S1008, and a sheet-interval APC as a second light-intensity correction is performed. After the sheet-interval APC at Step S1008, the image forming process is completed (Step S1011).

Figure 20:
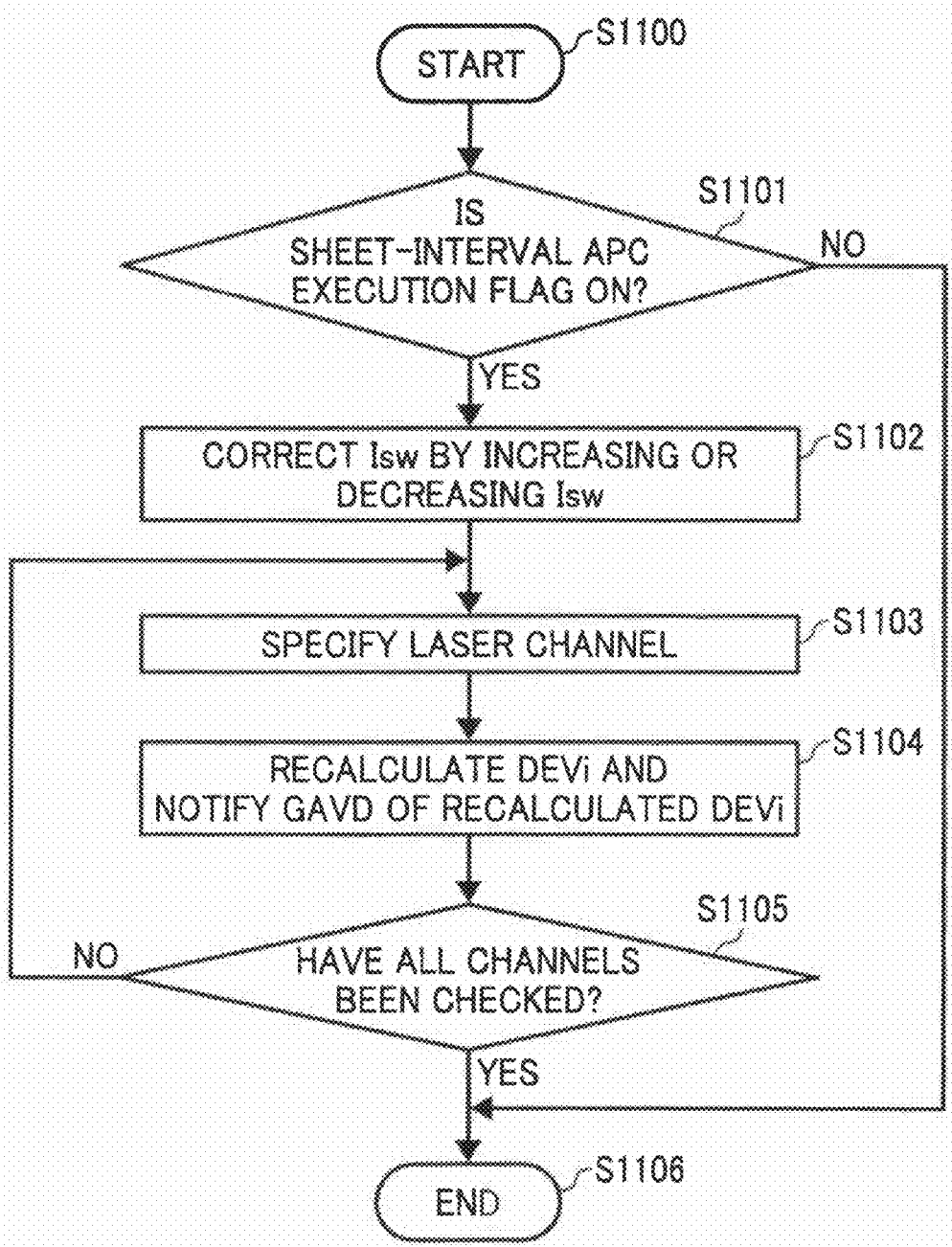
FIG. 20 is a flowchart of the sheet-interval APC.

FIG. 20 is a flowchart of the sheet-interval APC at Step S1008. The sheet-interval APC is started at Step S1100. It is determined whether a correction value DEVi is within the DEV adjustable range based on a state of the sheet-interval APC execution flag (Step S1101). If it is determined that the correction value DEVi is within the DEV adjustable range (NO at Step S1101), the process control goes to Step S1106, and a light intensity of a laser beam of the channel is corrected by the line APC.

On the other hand, if it is determined that the correction value DEVi is beyond the DEV adjustable range (YES at Step S1101), a secondary correction value SC is set so as to increase or decrease a drive current flown into the channel (Step S1102). A value of "SC×Isw(m)=Isw(m+1)" is set as a newly-corrected current Isw, and a laser channel corresponding to the newly-corrected current Isw is specified (Step S1103). The newly-corrected current Isw is output to the GAVD 200 to rewrite data so that the correction value DEVi is within the DEV adjustable range (Step S1104). Incidentally, when Equation (1) is used for the calculation of the newly-corrected current Isw, the secondary correction value SC is obtained by "{DEVi(n)_max+DEVi(n)_min}/2". After that, a correction value DEV of each of the channels with respect to the newly-corrected current Isw is obtained by the line APC (Step S1104). It is determined whether all the channels have been checked (Step S1105). If it is determined that all the channels have been checked (YES at Step S1105), the process control goes to Step S1106, and a notification of the end of the sheet-interval APC is issued to assert the sheet-interval signal "fgate". On the other hand, if it is determined that all the channels have not been checked (NO at Step S1105), the process control returns to Step S1103, and the following steps are repeatedly performed until all the channels have been checked.

Every time the sheet-interval APC is performed, the secondary correction value SC is calculated and updated until the memory 308 is reset, so that it is possible to output a laser beam having an appropriate light intensity depending on image forming characteristics of the image forming apparatus 100. The secondary correction value SC is held until the secondary correction value SC is cleared by the event of the image forming apparatus 100, such as the reset, auto power off, or power switch off of the image forming apparatus 100. The factory default value is reset together with default settings when the image forming apparatus 100 is powered on next or at the next start-up time.

Figure 21:
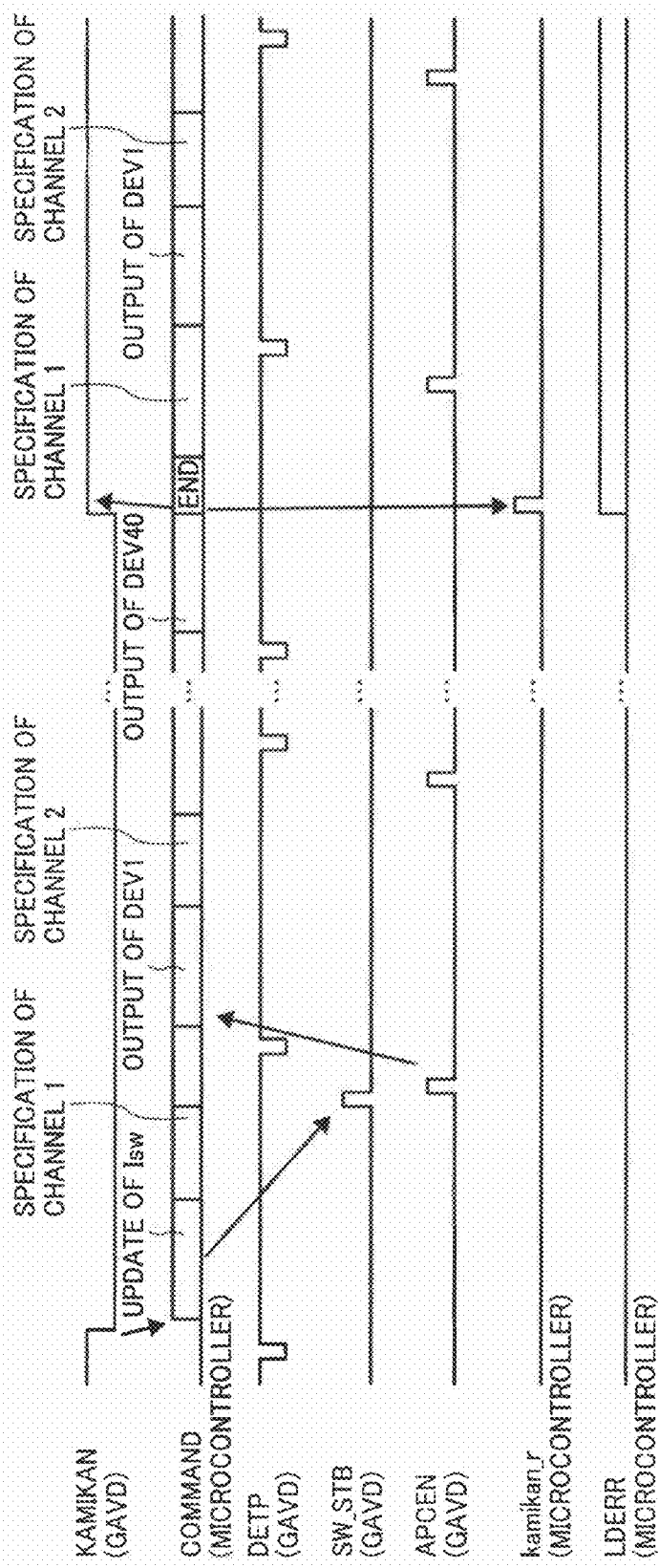
FIG. 21 is a timing chart of the sheet-interval APC performed by the microcontroller.
Figure 22:
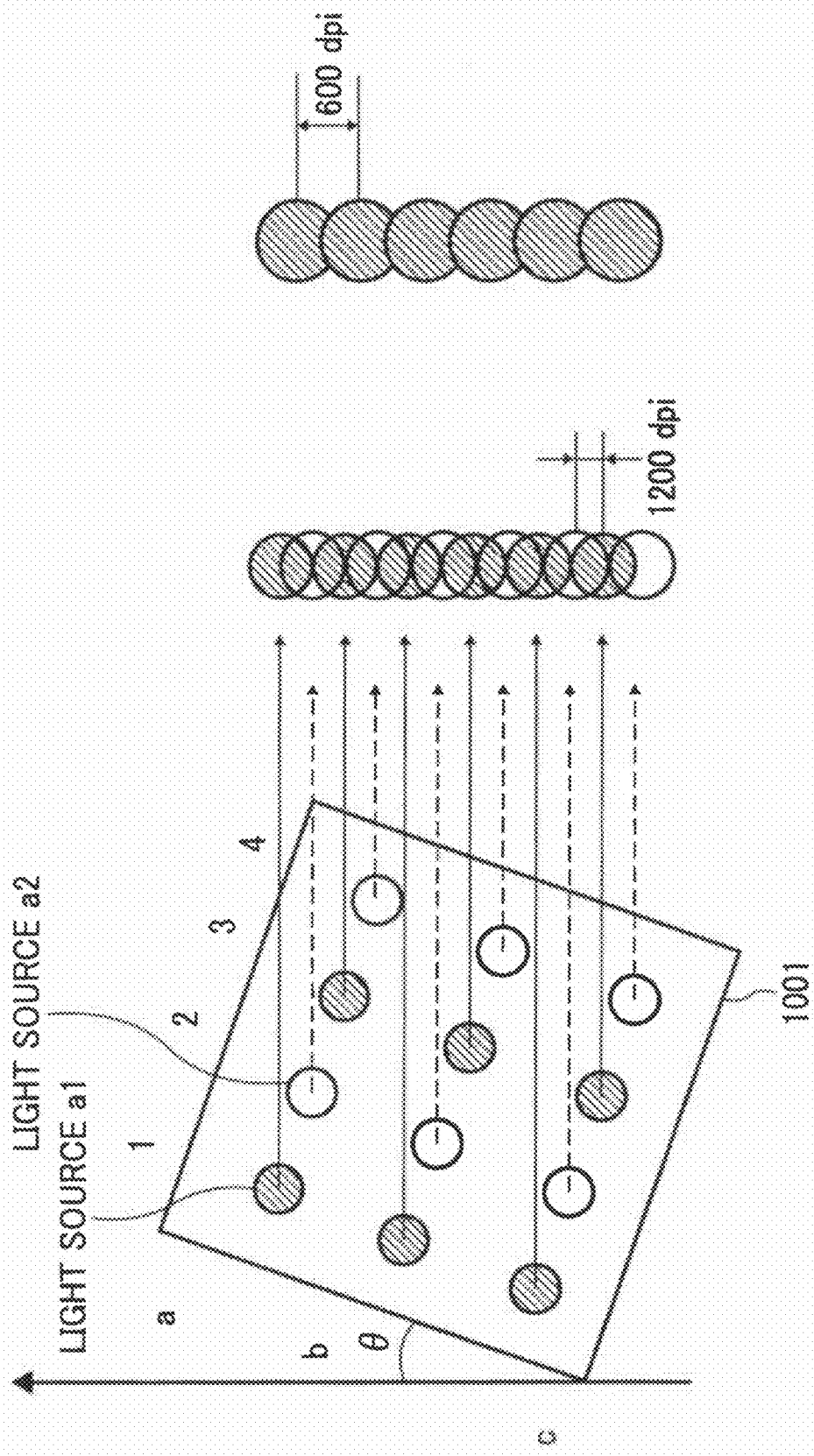
FIG. 22 is a schematic diagram of an example of a light source unit composed of a laser diode array or a surface emitting laser.

FIG. 21 is a timing chart of the sheet-interval APC performed by the microcontroller 302. Upon detecting a timing at which the GAVD 200 negates the sheet-interval signal "fgate", the microcontroller 302 starts performing the sheet-interval APC. Namely, when the sheet-interval signal "fgate" is negated, the microcontroller 302 performs the sheet-interval APC shown in FIG. 20 if there are any channel that a correction value DEVi is beyond the DEV adjustable range. In the sheet-interval APC, a current Isw or a correction value DEVi is corrected. Such a process is repeatedly performed until the channel 40 as the last channel has been checked. After the channel 40 has been checked, the microcontroller 302 outputs a signal "kamikan_r" indicating a notification of the end of the sheet-interval APC to the GAVD 200 so as to cause the GAVD 200 to start controlling the VCSEL 208.

In this manner, when a light intensity of a laser beam of each of the channels is not controlled while an image is formed, such a light-intensity control is performed in the sheet intervals. Therefore, it is possible to form an image at high speed because an image forming process is not interrupted by the light-intensity control.

When the microcontroller 302 determines that an error occurs in the laser diode element because a level of an output voltage from the photoelectric converting element 218 exceeds a threshold stored in the ROM area of the memory 308, the microcontroller 302 outputs an error signal "LDERR" indicating a notification of the error occurring in the laser diode element to the GAVD 200. When the error signal "LDERR" is asserted, the GAVD 200 notifies the main CPU 300 of the error occurring in the laser diode element, and instructs the main CPU 300 to perform error processing, for example, to display an error message "service call".

Specifically, the microcontroller 302 determines an occurrence of an error in the laser diode element based on a level of an output voltage from the photoelectric converting element 218, the microcontroller 302 asserts an error signal "LDERR", and simultaneously reads out an error code from the ROM area of the memory 308. The error code is preliminarily stored in the ROM area at the factory as the default setting. The microcontroller 302 outputs the error code to the GAVD 200. The GAVD 200 sets a value indicating a type of the error in the register memory, and notifies the main CPU 300 of the type of the error so that the main CPU 300 determines to perform appropriate error processing.

The error codes stored in the ROM area at the factory as the default setting are as follows:

[1] Error code 1: Error in the photoelectric converting element 218

Detection: When monitor voltages of all the channels of the VCSEL 208 are 0 volt (V), and an output voltage from a light-intensity measuring unit that measures a light intensity based on an output level of a laser beam, such as the synchronous detecting unit 220, is not 0 mV.

[2] Error code 2: Error in the VCSEL 208

Detection: When monitor voltages of all the channels of the VCSEL 208 are 0 V, and an output voltage from the light-intensity measuring unit is also 0 mV.

[3] Error code 3: Error in the Specific Channel of the VCSEL 208

Detection: When a monitor voltage of the specific channel of the VCSEL 208 is 0 V. In this case, the channel number is also output to the GAVD 200 so as to be written in the register memory of the GAVD 200.

Furthermore, following error codes of types of errors that occur in the initialization process can be stored in the ROM area in addition to the above error codes.

[4] Error code 4: Failure to obtain monitor voltages for all the channels

Detection: When monitor voltages of all the channels of the VCSEL 208 are 0 V.

[5] Error code 5: Failure to obtain a monitor voltage for the specific channel

Detection: When a monitor voltage of the specific channel of the VCSEL 208 is 0 V.

[6] Error code 6: Degradation of the VCSEL 208

Detection: When all correction values for all the channels are not within the DEV adjustable range of ±32%.

Moreover, the error signal "LDERR" can be set during the line APC. Following error codes of types of errors that may be detected during the line APC can be stored in the ROM area.

[7] Error code 7: Failure to obtain a monitor voltage for the specific channel

Detection: When a monitor voltage of the specific channel of the VCSEL 208 is 0 V.

[8] Error code 8: Degradation of the VCSEL 208

Detection: When all correction values for all the channels are not within the DEV adjustable range of ±32%.

Furthermore, a following error code of a type of an error that is detected during the sheet-interval APC can be stored in the ROM area.

[9] Error code 9: Degradation of the VCSEL 208

Detection: When a correction value for any of the channels is not within the DEV adjustable range of ±32% even after the current Isw is changed.

The errors of the errors codes 6 and 8 are recovered by the sheet-interval APC. If the error cannot be recovered by the sheet-interval APC, a type of the error is eventually notified as the error code 9. The image forming apparatus 100 notifies the main CPU 300 of error information obtained by the GAVD 200. Upon receiving the error information, the main CPU 300 displays an error message, for example, "service call" on an operation panel of the image forming apparatus 100.

As described above, the image forming apparatus according to the embodiment can efficiently correct a light intensity of each of multiple laser beams emitted from a VCSEL. Therefore, the image forming apparatus according to the embodiment can form a high-quality image with minimizing a size of a circuit and a maintenance cost and also preventing an affect on a latent-image forming process.

Although the present invention has been described with reference to the above embodiments, the present invention is not limited to the embodiments. Since other embodiments, changes, additions, modifications, and deletions within the spirit and scope of the invention will become apparent to those skilled in the art.

According to an aspect of the present invention, a light intensity of each of laser beams emitted from a plurality of light sources is controlled in such a manner that a correction value with respect to a common drive current is created by each of the laser beams based on a predetermined drive current used in common among the light sources and an output voltage depending on the light intensity of each of laser beams separated from the laser beams, and controls the light intensity of each of the laser beams based on each of the created correction values. Therefore, even when an image is formed with multiple laser beams, it is possible to control a light intensity of each of the laser beams to be emitted efficiently without increasing a size of a circuit. In other words, a current correction value by each channel is created depending on output characteristics of the laser beams, and the common drive current that is in common among the channels is corrected based on the created correction value by each channel, and thereby correcting the light intensity of each of the laser beams. Therefore, it is possible to control the light intensity of each of the laser beams efficiently with minimizing the increase of the size of the circuit.

Furthermore, according to another aspect of the present invention, an image forming apparatus includes a control unit that calculates a control value by monitoring a light intensity of each of laser beams and an optical device including an ASIC that receives the control value from the control unit, notifies a drive unit driving light sources of the control value, and controls the light intensity of each of the laser beams. Upon receipt of a synchronization signal, the ASIC measures a light intensity of each of laser beams emitted from the light sources, such as surface emitting lasers, by a first light-intensity correction before a photosensitive element is scanned by the laser beams, and obtains a monitor voltage based on the measured light intensity. The image forming apparatus calculates a correction value with respect to a drive current flowing into a laser diode element for forming a latent image by each of the laser beams based on the monitor voltage corresponding to the measured light intensity of the laser beam.

After the calculation of the drive-current correction value, to form a latent image, a VCSEL is caused to emit laser beams having a predetermined light intensity controlled thereto by the drive-current correction value. When such a correction value cannot be set, an upper limit or a lower limit of a correctable range is temporarily set so that the image forming apparatus can continuously perform an image forming process till a subsequent sheet-interval timing without suspending the image forming process. Therefore, even if a light intensity of a specific laser diode element is out of a control range, an effect on the latent image can be minimized.

Moreover, the control unit performs a second light-intensity correction at the sheet-interval timing notified by the ASIC. In the second light-intensity correction, it is determined whether a laser diode element can provide a laser beam having a predetermined light intensity, i.e., a light intensity of the laser beam is controlled to the predetermined light intensity by a correction value within the currently-set correctable range. If the light intensity of the laser beam cannot be controlled to the predetermined light intensity by a correction value within the currently-set correctable range, the correction value or the correctable range is corrected. Upon receipt of a corrected control value from the control unit, the ASIC activates a laser diode element assigned to a corresponding channel by the use of the corrected control value.

In this manner, the image forming apparatus according to the embodiments can control an optimal light intensity of each of multiple laser beams emitted from the VCSEL with minimizing an effect on a latent image by the use of a synchronization signal and a sheet-interval signal.

Therefore, the image forming apparatus according to the embodiments can form a high-quality image with minimizing a circuit size and a maintenance cost and also preventing an effect on formation of a latent image.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
a plurality of light sources that respectively emit a laser beam, all the light sources being driven by a common drive current;
a separating unit that separates each of the laser beams into a first laser beam used for measuring light intensity and a second laser beam used for scanning a photosensitive element;
a photoelectric converting unit that measures a light intensity of each of the first laser beams and outputs a voltage indicative of the light intensity; and
a control unit that controls a light intensity of each of the laser beams based on the common drive current and a corresponding one of a current correction value, which is set by each of the laser beams to correct a light intensity of a corresponding one of the laser beams based on a corresponding one of the voltages output by the photoelectric converting unit, wherein
the control unit controls a light intensity of each of the laser beams by performing any of
a first light-intensity correction including correcting the light intensity of each of the laser beams in response to a synchronization signal indicating a timing of updating the current correction value when the photosensitive element is scanned by the second laser beam, and
a second light-intensity correction including correcting the light intensity of each of the laser beams in response to a sheet-interval signal indicating a timing of correcting the common drive current in an interval between end of scanning of the photosensitive element by the second laser beam for an image to be output on a first recording medium and start of scanning of the photosensitive element by the second laser beam for an image to be output on a subsequent second recording medium, and
the control unit performs the first light-intensity correction when the current correction value is within a predetermined current correctable range for which it is possible to correct the light intensity to a target light intensity, and
the control unit performs the second light-intensity correction when the current correction value is out of the current correctable range.

2. The image forming apparatus according to claim 1, wherein the control unit calculates a correction value with respect to the current correction value within the current correctable range based on a drive current corrected based on the current correction value, the voltage corresponding to the current correction value within the current correctable range, and a preset voltage, and performs the first light-intensity correction based on the correction value.

3. The image forming apparatus according to claim 2, wherein the control unit calculates the correction value such that a previously-obtained correction value times a value that the preset voltage stored in the control unit is divided by the voltage to be output when each of the laser beams having the target light intensity controlled thereto by the drive current corrected by the current correction value within the current correctable range is emitted by the common drive current, and performs the first light-intensity correction based on a calculated correction value.

4. The image forming apparatus according to claim 1, wherein when the light intensity of each of the laser beams is not controlled to the target light intensity by the drive current corrected by the current correction value within the current correctable range, the control unit calculates a secondary correction value for increasing or decreasing the common drive current, and performs the second light-intensity correction based on the secondary correction value.

5. The image forming apparatus according to claim 4, wherein the control unit calculates the secondary correction value such that the drive current corrected by the current correction value of each of the laser beams is equal to an average of a maximum value and a minimum value of correction values with respect to the drive current of each of the laser beams, and performs the second light-intensity correction based on the secondary correction value.

6. The image forming apparatus according to claim 1, wherein
each of the light sources is a surface emitting laser, and
the control unit performs the first light-intensity correction during a line control process for controlling the light intensity at a timing at which the photosensitive element is scanned by each of the laser beams in a main scanning direction, or performs the second light-intensity correction during a sheet-interval control process for controlling the light intensity at a timing of start of scanning of the photosensitive element by the second laser beam for an image to be output on the second recording medium after end of scanning of the photosensitive element by the second laser beam for an image to be output on the first recording medium.

7. An image forming method implemented on an image forming apparatus including a plurality of light sources that respectively emit a laser beam, all the light sources being driven by a common drive current, the image forming method comprising:

separating with a separating unit each of the laser beams into a first laser beam used for measuring light intensity and a second laser beam used for scanning a photosensitive element;
measuring with a photoelectric converting unit a light intensity of each of the first laser beams and outputting a voltage indicative of the light intensity; and
controlling with a control unit a light intensity of each of the laser beams based on the common drive current and a corresponding one of a current correction value, which is set by each of the laser beams to correct a light intensity of a corresponding one of the laser beams based on a corresponding one of the voltages output at the measuring, wherein
the controlling includes controlling a light intensity of each of the laser beams by performing any of
a first light-intensity correction including correcting the light intensity of each of the laser beams in response to a synchronization signal indicating a timing of updating the current correction value when the photosensitive element is scanned by the second laser beam, and
a second light-intensity correction including correcting the light intensity of each of the laser beams in response to a sheet-interval signal indicating a timing of correcting the common drive current in an interval between end of scanning of the photosensitive element by the second laser beam for an image to be output on a first recording medium and start of scanning of the photosensitive element by the second laser beam for an image to be output on a subsequent second recording medium, and
the controlling includes performing the first light-intensity correction when the current correction value is within a predetermined current correctable range for which it is possible to correct the light intensity to a target light intensity, and
the controlling includes, when the current correction value is out of the current correctable range, calculating a secondary correction value for increasing or decreasing the common drive current, and performing the second light-intensity correction based on the secondary correction value.

* * * * *